(12) United States Patent
Dorini et al.

(10) Patent No.: US 11,787,116 B2
(45) Date of Patent: Oct. 17, 2023

(54) INFRARED RADIATION DEFLECTOR FOR APPARATUS FOR THE LAYER-BY-LAYER FORMATION OF THREE-DIMENSIONAL OBJECTS

(71) Applicant: Stratasys Powder Production Ltd., London (GB)

(72) Inventors: Gianluca Dorini, London (GB); Anders Hartmann, London (GB); Marcel Garrido Barrabes, London (GB); Steffen Kongensbjerg Larsen, London (GB)

(73) Assignee: Stratasys Powder Production Ltd., London (GB)

( * ) Notice: Subject to any disclaimer, the term of this patent is extended or adjusted under 35 U.S.C. 154(b) by 0 days.

(21) Appl. No.: 17/784,523

(22) PCT Filed: Dec. 11, 2020

(86) PCT No.: PCT/GB2020/053179
§ 371 (c)(1),
(2) Date: Jun. 10, 2022

(87) PCT Pub. No.: WO2021/116695
PCT Pub. Date: Jun. 17, 2021

(65) Prior Publication Data
US 2023/0028987 A1    Jan. 26, 2023

(30) Foreign Application Priority Data

Dec. 13, 2019  (GB) ...................................... 1918434
Dec. 13, 2019  (GB) ...................................... 1918435

(51) Int. Cl.
*B29C 64/286*     (2017.01)
*B33Y 30/00*      (2015.01)
(Continued)

(52) U.S. Cl.
CPC .......... *B29C 64/286* (2017.08); *B29C 64/153* (2017.08); *B29C 64/236* (2017.08);
(Continued)

(58) Field of Classification Search
CPC ... B29C 64/286; B29C 64/153; B29C 64/236; B29C 64/245; B29C 64/282;
(Continued)

(56) References Cited

U.S. PATENT DOCUMENTS 4,626,659 A    12/1986    Charmes et al.
5,031,120 A     7/1991    Pomerantz et al.
(Continued)

FOREIGN PATENT DOCUMENTS

DE       10145650 A1      4/2003
DE    102016205437 A1    10/2017
(Continued)

*Primary Examiner* — Nahida Sultana
(74) *Attorney, Agent, or Firm* — Honigman LLP; Eric J. Sosenko; Jonathan P. O'Brien

(57) ABSTRACT

An infrared radiation deflector (100) for an elongate infrared lamp (110), the radiation deflector (100) comprising opposing first and second elongate side walls (130_1, 130_2); at least one end support (170) connecting the ends of the side walls (130_1, 130_2); an upper opening (140) and a lower opening (150) arranged to pass lamp radiation to an exterior of the radiation deflector (100); and a mounting point (172) provided at the/each end support (170) for mounting the infrared lamp (110) and defining between them a lamp axis location (114); wherein the first and second elongate side walls (130_1, 130_2) comprise a first elongate mirror (130_1) and a second elongate mirror (130_2) extending parallel to the lamp axis location (114) and along at least a lower internal portion of the respective first and second side walls (130_1, 130_2); wherein the lamp axis location (114) extends along and between the first mirror (130_1) and the second mirror (130_2), the first and second mirror (130_1, (Continued)

130_2) each having a concave surface with respect to the lamp axis location (114); and wherein the first mirror (130_1) is an upward deflecting mirror and further arranged to be concave with respect to the upper opening (140) for redirecting at least a portion of direct lamp radiation through the upper opening (140).

20 Claims, 12 Drawing Sheets

(51) Int. Cl.
  *B29C 64/282*  (2017.01)
  *B29C 64/153*  (2017.01)
  *B29C 64/245*  (2017.01)
  *B29C 64/236*  (2017.01)
(52) U.S. Cl.
  CPC .......... *B29C 64/245* (2017.08); *B29C 64/282* (2017.08); *B33Y 30/00* (2014.12)

(58) Field of Classification Search
  CPC ... B29C 64/165; B29C 64/291; B29C 64/295; B33Y 30/00; B33Y 40/00; Y02P 10/25
  See application file for complete search history.

(56) References Cited

U.S. PATENT DOCUMENTS

| | | | |
|---|---|---|---|
| 2004/0037068 A1* | 2/2004 | Patterson | F21V 15/01 |
| | | | 362/147 |
| 2019/0329356 A1* | 10/2019 | Zhang | B33Y 10/00 |
| 2022/0219396 A1* | 7/2022 | Dorini | B33Y 40/00 |

FOREIGN PATENT DOCUMENTS

| | | |
|---|---|---|
| WO | 2011/071458 A1 | 6/2011 |
| WO | 2018/189701 A1 | 10/2018 |
| WO | 2019/212484 A1 | 11/2019 |

\* cited by examiner

INFRARED RADIATION DEFLECTOR FOR APPARATUS FOR THE LAYER-BY-LAYER FORMATION OF THREE-DIMENSIONAL OBJECTS

The present disclosure relates to an infrared radiation deflector for an apparatus for the layer-by-layer formation of three-dimensional (3D) objects, to a lamp assembly comprising such an infrared radiation deflector, and to apparatus for layer-by-layer formation of 3D objects comprising such a lamp assembly. The lamp radiation deflector may be particularly suitable for use in powder bed applications that require infrared radiation for thermal pre-heating and/or consolidation of the particulate material by sintering.

BACKGROUND

Applications such as laser sintering, or so-called "print and sinter" techniques such as high speed sintering, for forming three-dimensional objects from particulate material are receiving increased interest as they are moving towards faster throughput times and become industrially viable. In these processes, the object is formed layer-by-layer from particulate material that is spread in successive layers across a build surface. Each layer of particulate matter is fused, or sintered, over defined regions to form a cross section of the three-dimensional object.

These applications use infrared lamps to preheat the layer and/or to sinter the defined regions. For example, "print and sinter" applications use a high power infrared lamp to sinter areas of particulate material, such as polymer powder, that have been printed with radiation absorptive material (RAM). The RAM enables the printed powder to absorb lamp energy over a wavelength band that is different to the absorption band of the unprinted powder, thus providing selectivity.

One problem that the sintering lamp may cause is that its radiation may excessively heat nearby components, such as the lamp housing in which infrared lamps are conventionally housed. This may adversely affect the quality and functionality of other parts within the nearby environment; this is because sufficiently hot surfaces turn into secondary radiation sources that may radiate at wavelengths within the absorption band of the unprinted powder. This reduces selectivity of sintering by partially consolidating the unprinted powder, preventing efficient reuse of the unprinted powder, and causing issues with recovering the object from the powder cake.

Furthermore, excessive temperatures can cause ink fumes and airborne particulate matter to stick to and accumulate on surfaces at or near the build bed, causing issues such as melting and dripping polymer onto the build bed and contaminating the layer. Therefore, the management of heat from the infrared lamps is of importance to provide a reliable process in which accurate consolidation of particulate material, depowdering of the object and recovery of unprinted material may be achieved.

SUMMARY

Aspects of the invention are set out in the appended independent claims, while particular embodiments of the invention are set out in the appended dependent claims.

The following disclosure describes, in one aspect, an infrared radiation deflector for an elongate infrared lamp, the radiation deflector comprising opposing first and second elongate side walls; at least one (and preferably two) end supports connecting the ends of the side walls; an upper opening and a lower opening arranged to pass lamp radiation to an exterior of the radiation deflector; and a mounting point provided at the/each end support for mounting the infrared lamp and defining between them a lamp axis location; wherein the first and second elongate side walls comprise a first elongate mirror and a second elongate mirror extending parallel to the lamp axis location and along at least a lower internal portion of the respective first and second side walls; wherein the lamp axis location extends along and between the first mirror and the second mirror, the first and second mirror each having a concave surface with respect to the lamp axis location; and wherein the first mirror is an upward deflecting mirror and further arranged to be concave with respect to the upper opening for redirecting at least a portion of direct lamp radiation through the upper opening.

According to a second aspect there is provided an infrared lamp carriage for an apparatus for the formation of three-dimensional objects by consolidation of particulate material, the infrared lamp carriage comprising an infrared radiation deflector and an elongate infrared lamp mounted to the infrared lamp carriage, wherein the lamp extends, in a length direction, along a lamp axis, and wherein the radiation deflector comprises: opposing first and second elongate side walls, wherein the first and second elongate side walls comprise a first elongate mirror and a second elongate mirror extending parallel to the lamp axis and along at least a lower internal portion of the respective first and second side walls; and an upper opening and a lower opening between the first and second side walls and arranged to pass lamp radiation to an exterior of the radiation deflector; wherein the lamp axis extends along and between the first mirror and the second mirror, the first and second mirror each having a concave surface with respect to the lamp axis; wherein the first mirror is an upward deflecting mirror concave with respect to the upper opening and positioned so as to redirect at least a portion of direct lamp radiation through the upper opening.

According to a third aspect there is provided an apparatus for the formation of three-dimensional objects by consolidation of particulate material, the apparatus comprising: a working space, the working space comprising a build bed surface of particulate material arranged at a lower surface bounding the working space, and a ceiling arranged at an upper surface bounding the working space; and the carriage according to the second aspect, arranged to move across the build bed surface; wherein the radiation deflector and the lamp of the carriage are positioned so that, in use, the lower opening passes radiation from the lamp towards the build bed surface and the upper opening passes radiation from the upper opening of the deflector into the working space and, optionally, towards the ceiling.

According to a fourth aspect there is provided an apparatus for the formation of three-dimensional objects by consolidation of particulate material comprising a working space, the working space comprising: a build bed surface of particulate material arranged at a lower surface bounding the working space, and a ceiling arranged at an upper surface bounding the working space; and a carriage to which a lamp assembly comprising the radiation deflector of the first aspect is mounted and for passing the lamp assembly across the build bed surface along a direction of travel; wherein a lamp is mounted to the mounting point(s) of the radiation deflector, and the at least two openings of the radiation deflector are arranged so that the lower opening allows radiation to pass towards the build bed surface and the upper opening allows radiation to pass into the working space and towards the ceiling.

BRIEF DESCRIPTION OF THE DRAWINGS

Reference is now directed to the drawings, in which.

In the Figures, like elements are indicated by like reference numerals throughout.

DETAILED DESCRIPTION

Infrared (IR) lamps are conventionally operated inside a lamp housing that has inner reflective walls and houses the lamp, and that has a lower opening through which radiation may reach the build bed surface of particulate material in which the object is to be built. The housing conventionally reflects any radiation not directly emitted through the lower opening towards the lower opening by use of downward internal reflectors, and in addition the housing may also absorb any excess lamp radiation. The temperature of infrared lamps in a high speed sintering apparatus tends to be well in excess of 1000° C. so that the housing can reach very high temperatures and starts to act as a source of secondary radiation of wavelengths able to be absorbed by the unprinted particulate matter. To prevent excessive heating, such housings may have active cooling, for example fluid cooling units, attached to them, or the housing body may be a hollow body that is fluid cooled. However, such approaches add complexity and weight to the housing. In addition, the printer comprises a working space bounded from below by a work surface comprising the build bed surface, and since the housing may be supported on a carriage that is moveable across the work surface and build bed surface, this also adds weight to a moveable component and complexity in integrating a robust fluid supply.

We have surprisingly found that replacing the conventional housing by a radiation deflector having an upper opening through which radiation unused for sintering can dissipate freely, and internally redirecting radiation so that it can dissipate freely, reduces or minimises the amount of heat transferred to the radiation deflector, thus preserving or enhancing selectivity. The unused radiation is redirected into the working space above the work surface and away from the build bed surface, and may more easily be managed via the comparatively large ceiling area of the apparatus. The radiation deflector is not considered in the same way as a housing since it is open at or near an upper surface, and it is not envisaged to present a large thermal mass as a conventional lamp housing would. Its primary purposes are to allow the lamp to be mounted and to upwardly release radiation not used for sintering or preheating.

Aspects relating to the radiation deflector, and apparatus for layer-by-layer formation of three-dimensional objects by the aggregation of particulate matter comprising a lamp assembly comprising the radiation deflector and a lamp will now be described with respect to FIGS. 1 to 10B.

Figure 1:
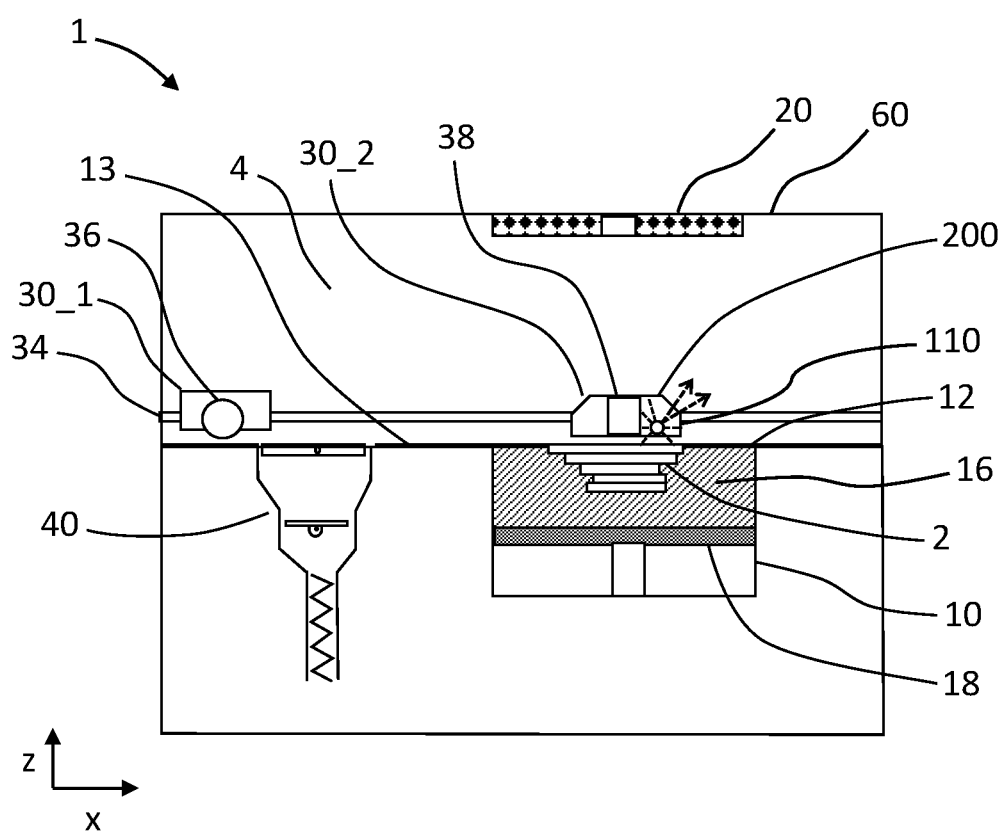
FIG. 1 is a schematic cross-sectional diagram of an apparatus for the layer-by-layer formation of three-dimensional objects comprising an infrared radiation deflector according to embodiments of the present invention.

FIG. 1 shows an apparatus 1 for layer-by-layer formation of three-dimensional objects by the aggregation of particulate matter by high speed sintering having a lamp radiation deflector 100 according to an embodiment of the present invention as part of a lamp assembly 200.

The apparatus 1 has a working space 4 bounded from below by a working surface 13 and from the top by a ceiling 60. One or more carriages 30 (in this case two) are arranged to be movable across a build bed surface 12 that is comprised within the working surface 13. The build bed surface 12 is the surface over which successive layers of particulate material, such as powder, are distributed and processed to form cross sections of an object 2. The apparatus 1 further comprises a powder container system 10 with a build bed 16 within which the object 2 is formed, layer by layer, from a build bed surface 12. A powder dosing module 40 is arranged to dose fresh powder to the working surface. The first and second carriages 30_1, 30_2 respectively support a distribution device 36, and a printing module 38 and a lamp radiation deflector 100 having a lamp 110 (together referred to as lamp assembly 200). The carriages are movable on at least one rail 34 back and forth across the build bed surface 12.

In an illustrative process sequence, the floor 18 of the powder container system 10, and which bounds the bottom surface of the build bed 16, lowers the build bed 16 by a layer thickness. With the first carriage 30_1 supporting the distribution device 36 located to the far side of the dosing module with respect to the build bed surface 12, and the second carriage 30_2 located on the opposite side of the build bed surface 12 with respect to the first carriage, the dosing module 40 doses an amount of powder to the work surface 13, adjacent the build bed surface 12. The first carriage is moved across the build bed surface 12 so that the distribution device 36 distributes the dosed powder so as to form a thin layer across the build bed surface 12. For example, the distribution device 36 may comprise a counter-rotating roller or a blade. Next, the first carriage 30_1 moves back to its starting position, followed by the second carriage 30_2. Starting from the dosing module side, the second carriage moves across the build bed surface to the opposite side and the one or more droplet deposition heads of the printing module 38 deposit fluid containing RAM over selected areas of the build bed surface 12 corresponding to the cross section of the object to be formed, and the infrared lamp 110 mounted within the lamp radiation deflector 100 is operated to sinter the printed powder. The process then may start again to proceed layer by layer until the object is fully built.

Since the infrared lamp 110 achieves very high temperatures in excess of 1000° C., nearby components furthermore require shielding from this heat to ensure they continue to operate reliably. One such component is the carriage to which the lamp assembly 200 is mounted. Thus the radiation deflector is preferably arranged to shield such components from the lamp heat.

The lamp is typically an elongate tube light, although this is not essential, and other shapes and types of radiation emitters are possible (and intended to be encompassed by the term "lamp" herein). The radiation is provided from the lamp across the width of the build bed surface. In FIG. 1 this is shown by way of example as spanning the width of the build bed surface, perpendicular to the direction of distribution, so that the radiation assembly may for example be elongate in the width direction so as to span the width of the build bed surface.

Figure 2A:
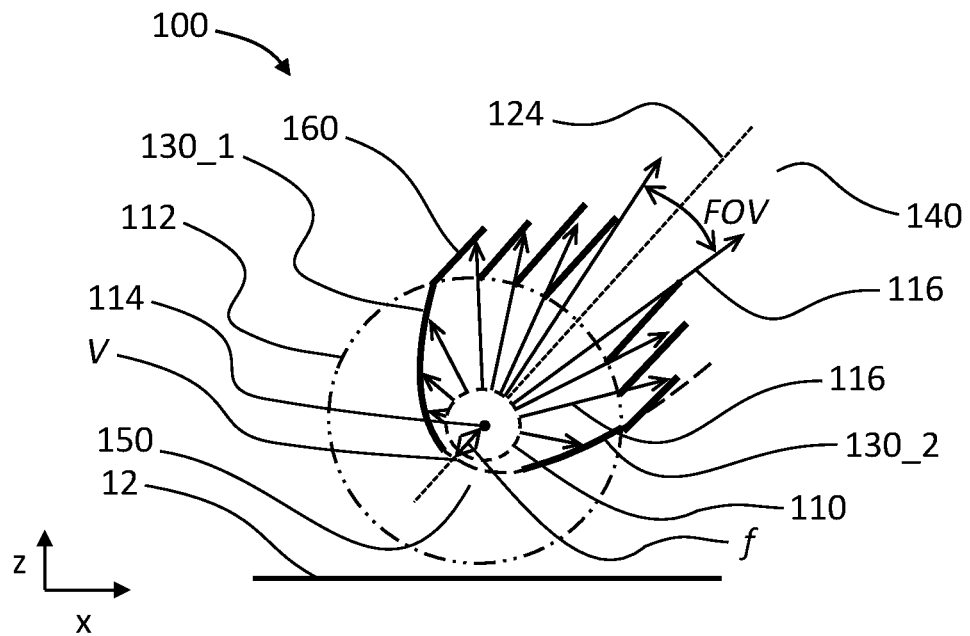
FIGS. 2A and 2B show a schematic cross-section of an infrared radiation deflector along the x-z plane according to a first embodiment.
Figure 2B:
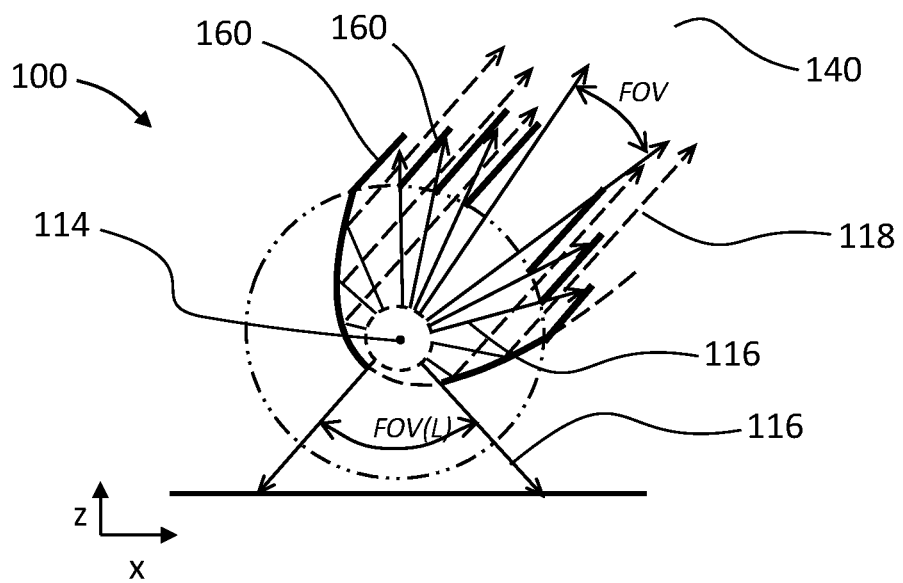
Figure 2C:
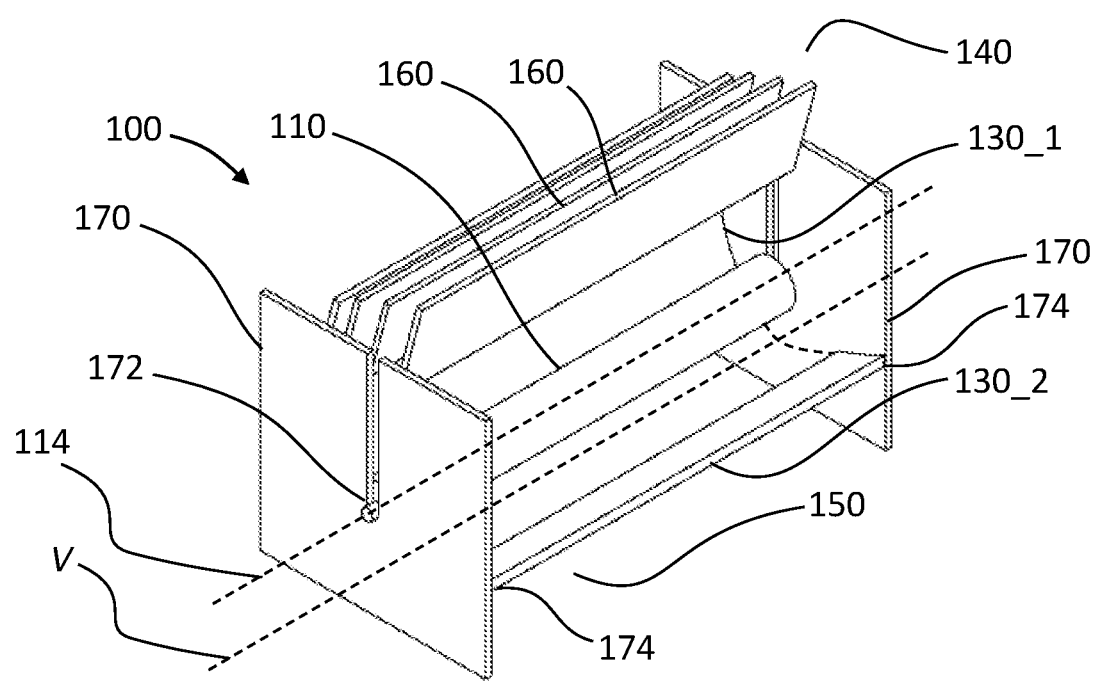
FIG. 2C is a schematic three-dimensional representation of the infrared radiation deflector of FIGS. 2A and 2B.

Accordingly, with reference for example to FIG. 2C, an infrared radiation deflector 100 for an elongate infrared lamp 110 is provided that comprises opposing first and second elongate side walls; at least one, and preferably two, end supports 170 connecting the ends 174 of the side walls; an upper opening 140 and a lower opening 150 arranged to pass lamp radiation to an exterior of the radiation deflector; and a mounting point provided at the/each end support 170 for mounting the infrared lamp 110 and defining a lamp axis location 114;

wherein the first and second elongate side walls comprise a first elongate mirror 130_1 and a second elongate mirror 130_2 extending parallel to the lamp axis location 114 and along at least a lower internal portion of the respective first and second side walls;

wherein the lamp axis location 114 extends along and between the first mirror 130_1 and the second mirror 130_2, the first and second mirror each having a concave surface with respect to the lamp axis location, and wherein the first mirror 130_1 is an upward deflecting mirror further arranged to be concave with respect to the upper opening 140, and wherein the mirrors 130_1, 130_2 are shaped so as to redirect lamp radiation not passing directly through either opening to exit via the upper opening 140.

Thus, the first mirror 130_1 is arranged with respect to the lamp axis location 114 to receive direct lamp radiation and to redirect it through the upper opening 140. The second mirror 130_2 may be arranged in a similar manner, or it may be arranged to reflect direct lamp radiation back onto the lamp axis location and/or the first mirror such that the first mirror redirects the reflected lamp radiation out of the upper opening 140.

In an apparatus 1, the lamp radiation deflector 100 is mounted such that radiation passing from the lower opening 150 can preheat or sinter selective areas of the build bed surface. The upper opening at least partially faces the ceiling 60. By "at least partially" it is meant that the area described by the opening need not be parallel to the plane of the ceiling, and the radiation emerging from the upper opening need not emerge at an angle that is a vertical to the build bed surface and the ceiling. The area of the upper opening 140 might instead be non-parallel to the ceiling, for example with respect to the direction of travel of a carriage where the deflector is mounted to a moving carriage. Such an angle may be achieved in different ways, which will be described with respect to FIGS. 2A to 5 and FIGS. 8A and 8B.

Linear Parabolic Mirrors and Parallel Radiation (FIGS. 2A-C and 3A-B)

An embodiment of the infrared radiation deflector 100 is shown in a schematic cross-section perpendicular to the lamp axis location 114 (i.e. along the y direction) in FIGS. 2A and 2B, and in a schematic perspective side view in FIG. 2C. In this embodiment, the first mirror 130_1 and second mirror 130_2 describe sections of a linear parabolic trough with the lamp axis location 114 located at the focal line f of the trough. The sections of the first mirror 130_1 and the second mirror 130_2 are opposing sections to either side of the vertex line V of the parabolic trough. An elongate lower opening 150 is provided near the vertex line V of the trough such that the lower opening 150 extends in the direction of the vertex line V.

Thus, the first mirror 130_1 may represent a section along and to one side of the vertex line of a linear parabolic trough, so that the cross section of the first mirror as viewed down the lamp axis location (along the y direction) is part of a parabola for redirecting at least a portion of "direct" lamp radiation 116 in the form of parallel (redirected) radiation through the upper opening 140. The first mirror 130_1 as shown in FIG. 2A has a cross-section extending linearly along, and to one side of, the vertex line V of the parabolic trough. For example, the section may extend to the lower opening and its lower edge may extend linearly and be aligned with, or define, the edge of the lower opening. The upper edge of the first mirror 130_1 may extend parallel to the lower edge of the first mirror.

More particularly, FIG. 2A shows the direct lamp radiation 116 that may be expected to emerge from lamp axis location 114 when a lamp 110 (as indicated) is fitted, and FIG. 2B, while omitting some of the labels of FIG. 2A for simplicity but which equally apply, shows the direct lamp radiation 116 and the redirected lamp radiation 118. In the embodiment of FIGS. 2A and 2B (and FIG. 2C), the second mirror 130_2 is similarly shaped as the first mirror 130_1, and is arranged, almost in mirror image with respect to the plane of symmetry 124 of the trough, opposite the first mirror. The plane of symmetry 124 comprises the vertex line V. The radiation deflector 100 represents thus a portion of a linear parabolic trough mirror, where the inner surfaces to either side of the vertex line V are arranged to redirect direct lamp radiation 116 in the form of parallel radiation 118 out of the upper opening 140 as shown in FIG. 2B.

Thus the first mirror and the second mirror may represent respective sections along and to opposite sides of the vertex line of a linear parabolic trough. Each mirror is concave with respect to the upper opening and is arranged to deflect at least a portion of direct lamp radiation 116 in the form of parallel (redirected) radiation 118 through the upper opening 140.

In addition, although not essential, FIG. 2B indicates how radiation absorbing surfaces 160 may be provided to the lamp radiation deflector 100 to block some of the direct radiation 116 so as to control the extent of the FOV as defined by the two innermost absorbing surfaces. The absorbing surfaces referred to in the following are non-reflective surfaces. They may for example have a black radiation absorbent finish at least over surfaces that are exposed to receive infrared radiation from the lamp (whether direct or reflected/redirected).

In FIGS. 2A and 2B, the radiation deflector 100 is tilted with respect to the build bed surface 12 such that the plane of symmetry of the parabolic trough is not perpendicular to the build bed surface. The lower opening 150 is offset from the vertex line such that the plane described by the lower opening 150 is angled with respect to the build bed surface 12. While this is optional, it may be beneficial in cases where the lower opening is to create a uniform field of view FOV(L) that is symmetric about the perpendicular to the build bed surface 12.

Therefore, when viewed in cross section down the lamp axis location (along the y direction), the upper opening 140 may be arranged symmetrically with respect to the plane of symmetry of the linear parabolic trough of which the first and second mirrors represent sections.

FIG. 2C shows a schematic three-dimensional view of the radiation deflector 100 of FIGS. 2A and 2B, illustrated with the lamp 110 mounted to the mounting point 172 of each end support 170. The end supports 170 connect the ends 174 (only shown for the second mirror 130_2) of the side walls (the mirrors 130_1, 130_2 in this case) of the deflector. The absorbing surfaces 160 on the side of the second mirror are not shown, so that the inner shape of the deflector and the lower opening 150 may be seen. The three-dimensional view also shows the lamp axis location 114 and the vertex line V.

As illustrated, each of the end supports 170 may be in the form of a plate. Advantageously, this helps to constrain and direct the radiation emitted from the lamp 110. However, in alternative embodiments each of the end supports 170 may take another form, such as an arrangement of supporting struts, or one or more brackets.

Further, as illustrated, there may be an end support 170 at each end of the radiation deflector 100. Advantageously, this gives improved structural rigidity to the components, e.g. the lamp 110 and the side walls (mirrors 130_1, 130_2 in this case). However, alternative embodiments may employ a single end support 170, at only one end of the radiation deflector, provided the components (e.g. the lamp 110 and the side walls) are securely supported from that one end, and the lamp is of a type that is powered from only one end.

In the Figures, the dashed circle concentric with the lamp axis location 114 indicates the vaporisation front 112 of the lamp. Within a cylindrical envelope about the lamp axis location 114, defined by the lamp power, organic matter is pyrolised due to the high temperature of the lamp, preventing it from settling and accumulating on surfaces located within this envelope.

This envelope is herein referred to as the vaporisation front 112 of the lamp 110, within which, in an oxygen containing atmosphere for example (as may typically be the case in a high speed sintering printer), temperatures to achieve pyrolysis of polymer powder may need to be 300° C. or higher.

During a sintering step at high duty cycle (e.g. 100% for a 3000 W lamp), the vaporisation front may extend radially to 200 mm from the lamp axis location. It is therefore desirable to locate the mirror surfaces within the vaporisation front of the lamp and the absorbing surfaces outside the vaporisation front. In this way, the mirrors remain reflective and the absorbing surfaces remain black and absorptive to IR radiation.

Since the vaporisation front 112 is a function of lamp power, depending on the lamp type and/or operation of the lamp, the location of the front may change. The mirrors may thus need to be located within the vaporisation front defined by the smallest power applied to the infrared lamp, for example when operated as pre-heat lamp. Alternatively, higher bursts of energy applied to the lamp periodically while away from the build bed surface may be used to clean the mirrors.

Figure 3A:
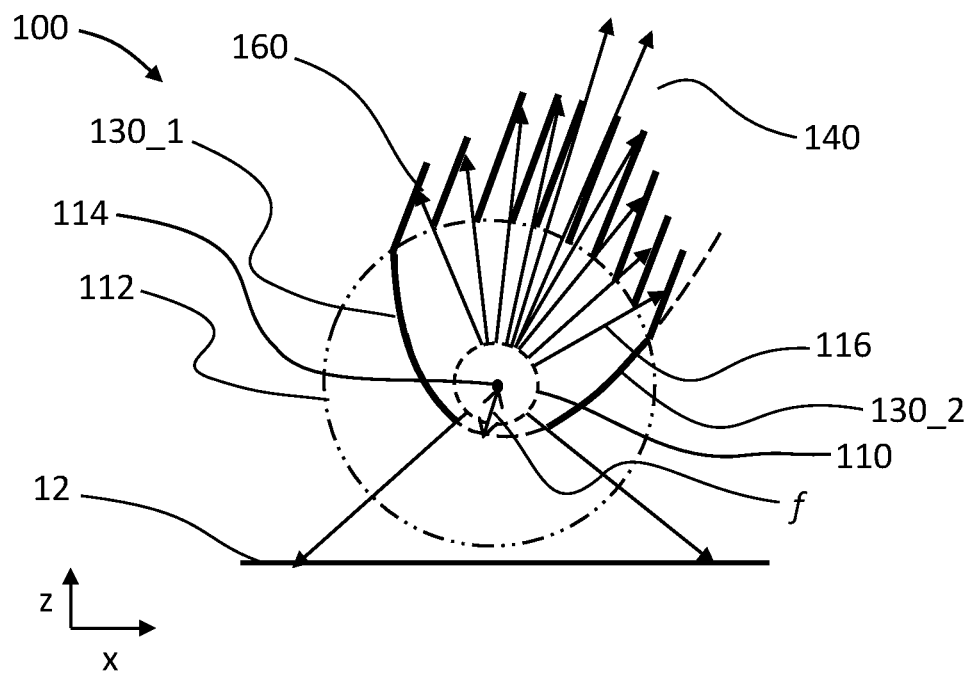
FIGS. 3A and 3B show a schematic cross-section of an infrared radiation deflector along the x-z plane according to a variant of the first embodiment.
Figure 3B:
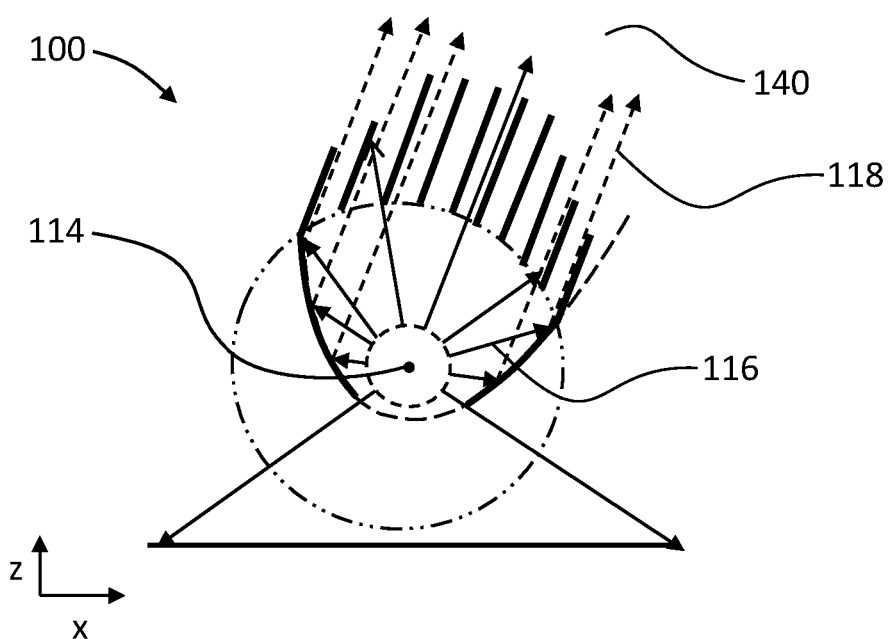

A variant of the lamp radiation deflector of FIGS. 2A-C is shown in FIGS. 3A and 3B. In this variant, the absorbing surfaces 160 are provided along the entire upper opening 150 so as to ensure that the emerging radiation is parallel and the field of view of the upper opening is controlled. The numerals for FIG. 2A equally apply but have been omitted for simplicity. It can be seen how the start and end points, in cross section, of the absorbing surfaces 160 require careful placement to effectively block out any non-parallel direct lamp radiation. The spacing and/or extent of the absorbing surfaces, along the z-direction, may further be determined by the heat dissipating properties, e.g. convection flow, provided by the absorbing surfaces 160. FIG. 3A thus shows how direct lamp radiation 116 is blocked by the absorbing surfaces 160 while any redirected radiation 118 is allowed to pass in between the absorbing surfaces. It may thus be preferable to align the absorbing surfaces 160 such that they are parallel to one another and further parallel to the direction of the redirected radiation 118, i.e. parallel to the plane of symmetry of the linear parabolic trough of which the two mirrors 130_1, 130_2 represent sections. The arrangement of the absorbing surfaces 160 in FIG. 3, which furthermore are preferably located outside of the lamp vaporisation front 112 so as to ensure they remain absorbent, achieves the purpose of only or predominantly allowing parallel radiation to pass through the upper opening 140. Thus the directionality of the radiation is controlled and the angular spread that defines the field of view FOV is equal to or at least close to zero. This may for example be useful where certain locations or features at or near the ceiling 60 of the working space 4 are to be protected from receiving radiation from the upper opening. This will be illustrated in more detail with respect to FIG. 6.

Thus the first mirror and the second mirror, when viewed in cross section down the lamp axis location, are non-identical sections along and to opposite sides of the vertex line of a linear parabolic trough arranged with its focal line at the lamp axis location, and the lower opening extends off-centre with respect to the vertex line. Where the lower opening is offset with respect to the vertex line, this may simply mean that the upper edges of the mirrors extend to the same line that is a first perpendicular to the plane of symmetry, and the lower edges do not extend to the same line that is a second perpendicular to the plane of symmetry of the linear parabolic trough. This may be preferential where the plane of symmetry of the infrared deflector is not a perpendicular to the build bed surface, i.e. it is tilted with respect to the build bed surface so that the upper opening releases parallel infrared radiation angled towards a side of the working space rather than vertically up to the ceiling.

Figure 4A:
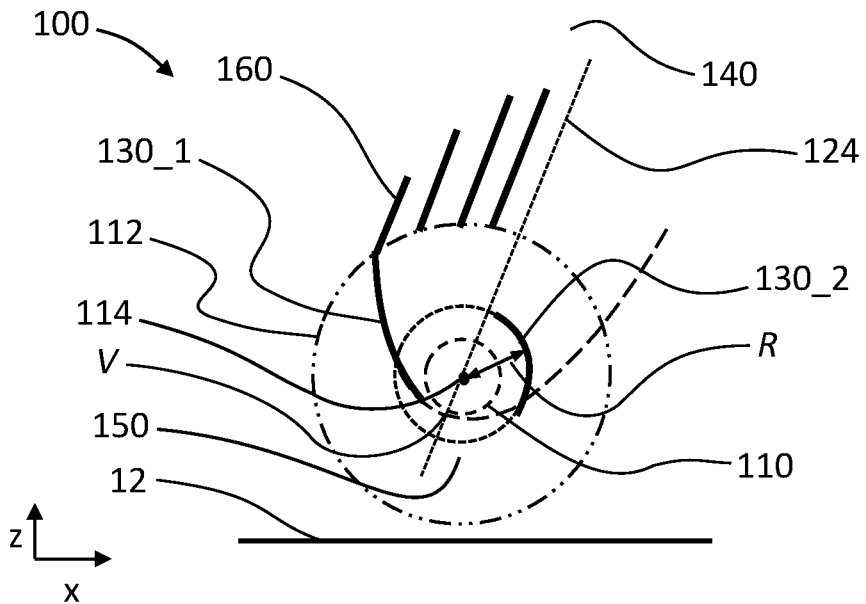
FIGS. 4A and 4B show a schematic cross-section of an infrared radiation deflector along the x-z plane according to a second embodiment.
Figure 4B:
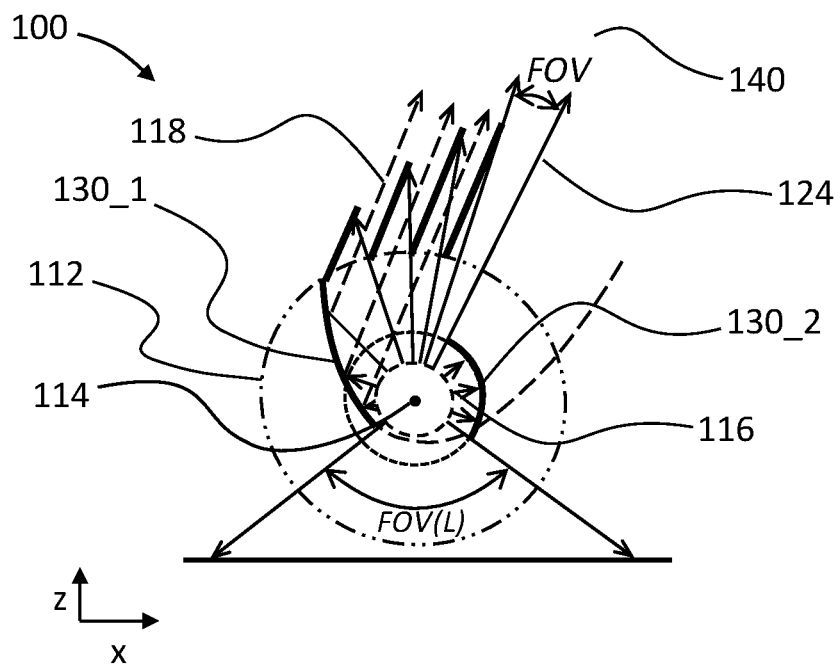

Linear Parabolic and Cylindrical Mirrors and Parallel Radiation (FIGS. 4A-B)

A second embodiment of the lamp radiation deflector of FIGS. 2A-C is shown in FIGS. 4A-B. Instead of both mirrors representing a section each of a linear parabolic trough, only the first mirror 130_1 forms a section of a linear parabolic trough. The second mirror 130_2 has a linear concave curvature about the lamp axis location 114, i.e. extending linearly along and parallel to the lamp axis location and curving about the lamp axis location. FIG. 4A is a schematic cross section perpendicular to the lamp axis location (i.e. along the y direction) of the infrared radiation deflector 100. In FIG. 4A, the focal line of the parabolic mirror 130_1 is coincident with the lamp axis location 114. The second mirror 130_2 may be a section of a linear cylindrical mirror with its focal line coincident with the lamp axis location 114. This means that any direct radiation 116 from the lamp is reflected back by the cylindrical mirror 130_2 onto the lamp axis location 114. As FIG. 4B illustrates, any direct lamp radiation 116 reaching the first (linear parabolic trough) mirror 130_1 is redirected as parallel infrared radiation out of the upper opening 140.

In this embodiment, the second mirror further acts as a radiation restrictor similar to the absorbing surfaces, although this is achieved by reflection rather than absorption. The upper edge of the second mirror delimits the angular spread of the FOV to one side of the upper opening 140. In addition, some of the reflected radiation may pass from the second mirror to the first mirror, either to be redirected to pass out of the upper opening, or to be absorbed by the absorbing surfaces.

The angular spread of the FOV to other side of the upper opening 140 may be delimited by radiation absorbent surfaces 160 arranged parallel to the direction of the redirected radiation, i.e. parallel to the plane of symmetry of the linear parabolic trough of which the first mirror 130_1 represents a section. As before, the radiation absorbent surfaces are preferably located outside of the vaporisation front 112 of the lamp 110 so as to ensure they remain absorbent and do not become reflective as a result of being pyrolised.

Therefore, instead of both the two mirrors 130_1, 130_2 representing sections of a linear parabolic trough as described with respect to the first embodiment in FIGS. 2A-C and 3A-B, only the first mirror 130_1 may be a section of a linear parabolic trough mirror and the second mirror 130_2 may represent a linear section of a cylindrical mirror with a cross section, as viewed down the lamp axis location 114 (along the y direction), that is part of a circle.

Since the section of the second mirror 130_2 is concave with respect to the lamp axis location 114, if its focal line is coincident with the lamp axis location, in use the lamp will reflect direct radiation back onto itself from the second mirror 130_2.

The first mirror 130_1, similar to the first embodiment, represents a parabolic trough section extending linearly along, and to one side of, the vertex line of the parabolic trough. For example, the section of the first mirror may extend to the lower opening 150 and its lower edge may extend linearly and be aligned with, or define, the edge of the lower opening. The upper edge of the first mirror 130_1 may extend parallel to the lower edge of the first mirror.

The lower edge of the second mirror 130_2 may extend linearly and be aligned with, or define, the edge of the lower opening 150. The upper edge of the second mirror 130_2 may extend parallel to the lower edge of the second mirror. The upper edges of both mirrors in combination define the area of the upper opening 140 and the field of view FOV. Optionally, the angular spread of the field of view FOV may be controlled further by providing absorbing surfaces 160 as shown and in a manner similar to those of the first embodiment. In some variants, the absorbing surfaces may be arranged along the entire upper opening. In the implementation shown, the vaporisation front 112 extends to the upper edge of the first mirror 130_1 and encompasses the second mirror 130_2. The absorbing surfaces in this implementation are thus preferably arranged from the upper edge of the first mirror 130_1 parallel to the plane of symmetry 124 of the parabolic trough, and with their inner edges located at or outside the vaporisation front 112 to ensure they remain absorbent during operation of the lamp 110.

Figure 5A:
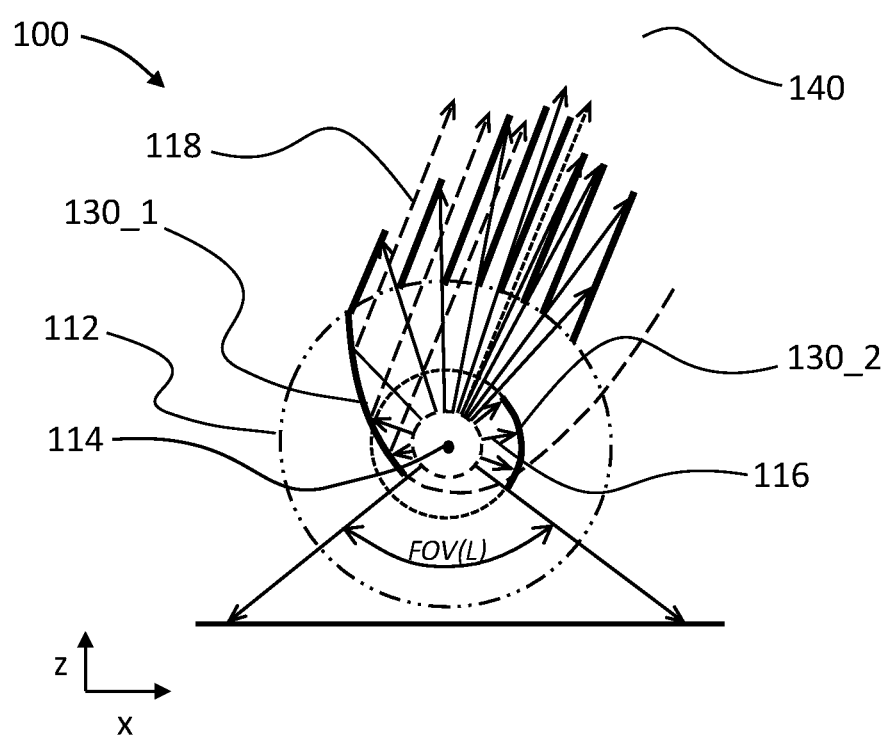
FIG. 5A shows a schematic cross-section of an infrared radiation deflector along the x-z plane according to a variant of the second embodiment.

Alternatively, the absorbing surfaces and the extent of the surface covered by the second mirror may be arranged so that between the upper edge of the second mirror 130_2 and the absorbing surfaces 160, any direct radiation passing between the upper edges of the first mirror 130_1 and second mirror 130_2 is absorbed by the absorbing surfaces. This is illustrated schematically in FIG. 5A. In a similar view to that in FIGS. 4A and 4B, FIG. 5A shows a radiation deflector 100 with non-identical mirrors—a first mirror 130_1 representing a section of a parabolic trough, concave with respect to the lamp axis location 114 and with respect to the upper opening 140, and a second mirror 130_2 representing a section of a cylindrical mirror extending along the lamp axis location 114, also concave with respect to the lamp axis location. By non-identical it is meant that the mirror sections are not mirror images of one another. Both mirrors have focal lines concentric with the lamp axis location 114. Absorbing surfaces 160 are parallel to the plane of symmetry 124 of the parabolic trough of which the first mirror 130_1 represents a section. Furthermore, they are arranged in spacing and extent so that radiation able to pass through the upper opening 140 may be radiation substantially parallel to the plane of symmetry 124 of the parabolic trough, i.e. is radiation redirected by the first mirror 130_1. Thus the angular spread of the FOV is near zero. In this implementation of the second embodiment, the second mirror 130_2 reflects direct lamp radiation back onto the lamp 110. It can further be seen how some of the direct lamp radiation may still pass a narrow portion of the upper opening 140. The radiation absorbing surfaces 160 are thus arranged to restrict the FOV of radiation passing through the upper opening 140.

With the variant of FIG. 4B, it is possible to block all non-parallel radiation by extending the upper edge of the second mirror 130_2 to or beyond the plane of symmetry. At the same time, the absorbing surfaces 160 may be located between the upper edge of the first mirror 130_1 and spaced across the opening, at intervals along the circumference of the vaporisation front towards (and beyond) the plane of symmetry 124, one absorbing surface coinciding with the plane of symmetry. In this way, the direct lamp radiation is either reflected by the second mirror 130_2 back towards the lamp 110; out of the lower opening 150; towards the first mirror 130_1 which redirects it as parallel radiation 118 out of the upper opening 140; or is absorbed by one of the absorbing surfaces 160.

Where parallel infrared radiation is to be emitted from the upper opening 140 so as to define and limit the FOV from the upper opening, in implementations comprising mirrors representing opposing sections to either side of the vertex line of a linear parabolic trough, or a first mirror 130_1 forming a linear parabolic trough mirror section and a second mirror 130_2 forming a linear cylindrical mirror section, the lamp axis location 114 may coincide with the focal line of the first mirror 130_1. In addition, the lamp axis location 114 may coincide with the focal line of the second mirror 130_2.

In implementations where the first mirror 130 is a section of a linear parabolic trough concave about the lamp axis location 114 and with respect to the upper opening 140, and the second mirror 130_2 is a section of a cylindrical mirror concave about the lamp axis location 114, the upper edge of the second mirror 130_2 may extend to the location of the plane of symmetry 124 defined by the parabolic trough. The absorbing surfaces 160 may extend parallel to the plane of symmetry 124 and may be spaced along the circumference outside of a suitable vaporisation front 112 of the lamp 110 (relating to the lamp power so as to preserve a black finish of the absorbing surfaces) from the upper edge of the first mirror 130_1 to and including an absorbing surface 160 coincident with the plane of symmetry 124. The absorbing surfaces may be arranged at a spacing and upward extent so as to block all or at least most of the non-parallel radiation (direct lamp radiation).

Absorbing Surfaces—FOV Limiters

The extent of angular spread of radiation passing the upper opening 140 may thus be modified and controlled by the upper opening comprising one or more radiation absorbing surfaces 160 arranged to block direct radiation from exiting the radiation deflector 100 at angles greater than a predetermined upper opening field of view FOV.

The radiation absorbing surfaces 160 may be elongate parallel planes extending in a direction parallel to the upper edges of the mirrors 130 wherein each absorbing surface has a depth and direction selected so as to block direct radiation from exiting the radiation deflector at angles greater than the predetermined upper opening field of view FOV while allowing radiation to pass at angles equal to or smaller than the predetermined upper opening field of view FOV. Optionally, the absorbing surfaces 160 may further extend in a direction parallel to the plane of symmetry 124 of at least the first mirror 130_1, where the first mirror 130_1 is a section of a parabolic trough having its focal line coincident with the lamp axis location 114 and thus capable of redirecting direct lamp radiation in form of radiation 118 in a direction parallel to the plane of symmetry 124. In other words, the absorbing surfaces 160 are arranged parallel to the radiation deflected by the at least first mirror 130_1.

Where radiation absorbing surfaces 160 are provided, the upper opening 140 is defined by the combined opening presented by the sub-openings defined between the radiation absorbent surfaces 160.

Figure 5B:
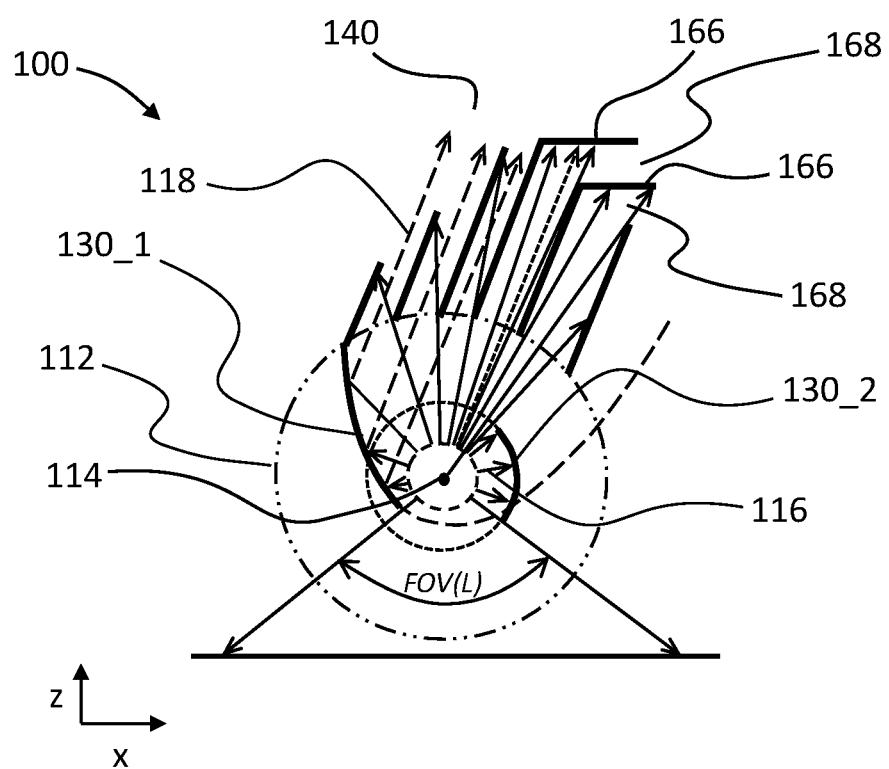
FIG. 5B is a schematic cross-section of a variant of the infrared radiation deflector of FIG. 5A comprising radiation blocking surfaces.

In some variants of the radiation deflector 100 the lamp radiation passing the upper edge of the second mirror 130_2 and/or the first mirror 130_1 may be further controlled by providing radiation blocking surfaces. An example of providing radiation blocking surfaces to the deflector 100 of FIG. 5A is illustrated in FIG. 5B. To ensure that the radiation emerging from the upper opening 140 is substantially parallel radiation, radiation blocking surfaces 166 extend horizontally outward to shade the upper sub-openings arranged on the far side of the plane of symmetry 124 of the parabolic trough mirror, first mirror 130_1 (the side on which the second mirror is located). The radiation blocking surfaces preferably do not close off the gap, or gaps, between radiation absorbing surfaces 160 on the far side of the plane of symmetry 124, but instead leave a venting gap 168 to allow heat to escape and to reduce the temperature of the surfaces of the deflector 100. Preferably the blocking surfaces 166 do not extend the area, or footprint, of the deflector that faces the build bed surface 12. In this way, any secondary black body radiation from the radiation deflector 100 that may affect the temperature of the unprinted (white) powder, and thus compromise the selectivity of consolidating the printed and unprinted powder, remains limited. Thus, a radiation blocking surface 166 may be provided to the upper edge of one or more of the radiation absorbing surfaces 160 so as to shield the working space 4 from direct lamp radiation emerging from one or more of the upper sub-openings of the upper opening 140. The radiation blocking surface, or surfaces, may extend horizontally, parallel to the build bed surface, although they may be slightly angled away from the horizontal. The radiation blocking surface may additionally, or instead, be arranged to provide a vent 168 between its outer edge and the adjacent radiation absorbing surface 160 towards which it extends, so as to allow heat to escape from the deflector. By providing a suitable arrangement of one or more radiation blocking surfaces 166, for example such as shown in FIG. 5B, the deflector 100 may only allow substantially parallel radiation to emerge from the upper opening 140. In a variant, one radiation blocking surface may extend across more than one upper sub-opening while providing a common vent 168 for the upper sub-openings it is arranged to shade.

Non-Parallel Radiation

In the above embodiments, the lamp axis location 114 may coincide with the focal line of the first mirror 130_1. In addition, the lamp axis location may coincide with the focal line of the second mirror 130_2.

It is however not essential that the focal line of either mirrors coincide with one another or with the lamp axis location. Furthermore, the second mirror may not be a linear cylindrical mirror, and may not have a focal line. The second mirror may instead generally be shaped as a concave trough mirror with respect to the lamp axis location. Such implementations may achieve emission of redirected radiation through the upper opening that is not parallel radiation. It may have a high FOV. The FOV may be controlled further by absorbing surfaces.

An example of a radiation deflector for which the mirrors are similar shapes as those of FIGS. 4A-B and 5A-B, but where the focal line of the second mirror is located below the focal line of the first mirror which coincides with the lamp axis location 114, may be envisaged. In this variant, lamp radiation would be reflected by the second mirror onto the first mirror, past the lamp, and redirected as non-parallel radiation by the first mirror.

In these variants, the radiation redirected by the first mirror is not parallel radiation. However, a large proportion of the unused lamp radiation (i.e. lamp radiation not passing through the lower opening 150) is passed through the upper opening 140 at a FOV that may require further control, for example by arranging absorbing surfaces 160 that delimit the spread of the radiation emerging from the upper opening. As an example, absorbing surfaces 160 may be arranged to absorb direct lamp radiation directed towards the inner surface of the deflector that is located above the upper edge of the first mirror. It will be appreciated that redirected radiation 118 emerges from the upper opening with a wide angle of the FOV.

Thus, in some variants, the lamp axis location 114 may not coincide with the focal line of the second mirror. Additionally, or instead, the first mirror 130_1 may represent a section along and to one side of the vertex line V of a linear parabolic trough mirror so that the cross section of the first mirror 130_1 as viewed down the lamp axis location 114 is part of a side of a parabola for redirecting at least a portion of the radiation reflected onto it by the second mirror 130_2. Furthermore, the second mirror 130_2 may be a reflecting mirror for reflecting direct lamp radiation onto the first mirror 130_1, and without passing through the lamp 110 first.

The second mirror 130_2 may generally be shaped as a concave trough mirror with respect to the upper opening 140.

The lamp axis location 114 may not coincide with the focal line of the second mirror 130_2.

General Points

In the above embodiments and their variants, the lower opening 150 and the upper opening 140 may preferably be elongate and arranged parallel to the lamp axis location 114. In other words, the lower opening and the upper opening are in part defined by the shape of the lamp, which typically spans the build bed surface in a direction perpendicular to the direction it travels across. For efficient redirection and reflection of lamp radiation by the mirrors, the lower edges of the first and second mirrors 130 may extend to the lower edges of the side walls. Additionally, or instead, the upper edge of the second mirror 130_2 may extend to the upper edge of the second side wall. This provides furthermore a compact radiation deflector having side walls that have a low thermal mass and are able to cool down quickly. Where nearby components require thermal protection, the outer surface of the radiation deflector may comprise thermally insulating material so as to avoid dissipation of heat from the deflector onto nearby surfaces.

To ensure that the mirrors 130 remain reflective, they may preferably be located within the lamp vaporisation front 112. Additionally or instead, to ensure that the radiation absorbent surfaces remain absorbent, the radiation absorbent surface 160 may be located outside of the lamp vaporisation front 112, for example outside of the pyrolising power envelope defined be the lamp 110 when actuated in sintering mode.

In some variants, there may be an upper wall portion of the inner surface of the radiation deflector not formed by a mirror and that is located at or in close proximity to the upper opening. In such cases it may be preferable that the upper wall portion is absorbent to IR radiation. This may avoid unwanted effects due to poorly controlled reflection by the upper portion of the side wall. The radiation absorbent upper wall portion may be provided above either mirror. Thus the upper opening 140 may be defined by a radiation limiting wall portion located at the upper edge of at least one of the side walls of the deflector, so as to absorb radiation reaching the radiation limiting wall portion. To ensure thermal dissipation of the absorbed radiation, the radiation limiting wall portion may comprise a group of vents.

Preferably, the centre line of the upper opening 140 and the centre line of the lower opening 150 are parallel to the lamp axis location 114. In other words, the elongate upper opening and the elongate lower opening may extend parallel to the lamp axis location. In some implementations it may be preferential that the lower opening represents an elongate slot for a uniform radiation footprint on the build bed surface. Additionally, or instead, the upper opening may also be in the form an elongate slot extending parallel to the lamp axis location 114 so as to release a uniform radiation profile into the working space and avoid the creation of hot spots in the apparatus 1 along the direction of elongation of the upper opening 140.

To further help thermal dissipation of heat of the side walls of the radiation deflector, at least part of the outer surface of the radiation deflector may comprise an IR radiant material. For example, part of the outer surfaces of the deflector may be a black body emitter. Preferably, the proposed deflectors may have mirrors 130 formed from thin metal sheet 0.4 to 1 mm thick. This ensures the mirrors have a low thermal mass and cannot hold heat, and having a high thermal conductivity (for example being made of metal) ensures ready heat dissipation. For example, the radiation deflector may temporarily pass through cooler air flows within the working space and is able to cool down quickly, or it may lose heat readily as soon as the lamp 110 is switched off.

In some variants, the proportion of radiation redirected by the mirrors 130 may be a majority of the lamp radiation not exiting direct through either aperture. By "majority" a proportion of the cylindrical radiation front of the lamp of greater than 50% area is intended. This means that the upper opening 140 is sufficiently large and the mirrors 130 redirect a sufficient proportion of radiation so as to ensure efficient removal of infrared radiation from the radiation deflector 100 so that it does not heat up excessively and become a secondary radiation source.

This may further be ensured by optionally arranging the lamp axis location 114 to be located nearer the lower opening 150 than the upper opening 140. This means the field of view of the lower opening may be adequately controlled and a significant proportion of lamp radiation not exiting through the lower opening 150 may be redirected through the upper opening 140 by the first and second mirrors 130_1, 130_2.

The Infrared Radiation Reflector Implemented within Apparatus (FIGS. 6, 7 and 8A-B)

It is noted that the way in which the deflector is mounted to the carriage or the way in which the lamp is mounted is not essential to the functionality of the deflector; its functionality is merely affected by the axial position of the lamp with respect to the side walls comprising mirrors and the upper and lower openings. Alternatively to the deflector described herein, the deflector may not have side walls. The deflector may be mounted directly to, or via a frame to, the carriage, for example by the ends of its side walls, and/or by a portion of its outer surface or otherwise. For example, the first and second side walls forming the deflector and respectively comprising the first and second mirrors 130_1, 130_2 may be individually mounted to the carriage. The lamp 110 may either be mounted to the deflector, or to one of the side walls of the deflector, or it may be separately mounted to the frame of the carriage or similar structure, as long as such mounting allows for the relative position of the lamp axis within the deflector according to the present description.

Accordingly, an infrared lamp carriage 30 for an apparatus for the formation of three-dimensional objects by consolidation of particulate material is provided, the carriage 30 comprising an infrared radiation deflector 100 and an elongate infrared lamp 110 mounted to the infrared lamp carriage, wherein the lamp 110 extends, in a length direction, along a lamp axis 114, and wherein the radiation deflector 100 comprises:

opposing first and second elongate side walls, wherein the first and second elongate side walls comprise a first elongate mirror 130_1 and a second elongate mirror 130_2 extending parallel to the lamp axis and along at least a lower internal portion of the respective first and second side walls; and an upper opening 140 and a lower opening 150 between the first and second side walls and arranged to pass lamp radiation to an exterior of the radiation deflector 100; wherein the lamp axis extends along and between the first mirror 130_1 and the second mirror 130_2, the first and second mirror each having a concave surface with respect to the lamp axis;

wherein the first mirror 130_1 is an upward deflecting mirror concave with respect to the upper opening 140 and positioned so as to redirect at least a portion of direct lamp radiation through the upper opening 140.

The second mirror 130_2 of the infrared radiation deflector 100 may be a reflecting mirror positioned so as to reflect direct lamp radiation onto the first mirror 130_1.

The second mirror 130_2 of the infrared radiation deflector may further represent an elongate section of a cylindrical mirror with a cross section as viewed down the lamp axis 114 that is part of a circle.

The first mirror 130_1 of the infrared radiation deflector 100 may represent a section along and to one side of the vertex line V of a linear parabolic trough so that the cross section of the first mirror 130_1 as viewed down the lamp axis 114 is part of a parabola positioned so as to redirect at least a portion of lamp radiation in the form of parallel radiation through the upper opening 140. In a variant, the second mirror may be arranged to reflect a portion of direct lamp radiation onto the first mirror 130_1, and the first mirror 130_1 may redirect at least some of the portion reflected onto it by the second mirror 130_2 in the form of parallel radiation through the upper opening 140.

The first mirror 130_1 and the second mirror 130_2 of the infrared radiation deflector may represent respective sections along and to opposite sides of the vertex line V of a linear parabolic trough, wherein each mirror is concave with respect to the upper opening and positioned so as to deflect at least a portion of direct lamp radiation in the form of parallel radiation through the upper opening 140. In some variants of the deflector, when viewed in cross section down the lamp axis, the upper opening 140 may be positioned symmetrically with respect to the plane of symmetry of the linear parabolic trough.

The first mirror 130_1 and the second mirror 130_2 of the infrared radiation deflector, when viewed in cross section down the lamp axis, may be non-identical sections along and to opposite sides of the vertex line V of a linear parabolic trough arranged with its focal line at the lamp axis 114, and wherein the lower opening 140 extends off-centre with respect to the vertex line V.

The lower opening 150 and the upper opening 140 of the infrared radiation deflector may be elongate and arranged parallel to the lamp axis. Additionally, or instead, the lamp axis 114 of the infrared radiation deflector may coincide with the focal line of the first mirror 130_1. Additionally, the lamp axis 114 of the infrared radiation deflector may coincide with the focal line of the second mirror 130_2.

In variants of the above described radiation deflectors, the upper opening 140 of the infrared radiation deflector may comprise one or more radiation absorbing surfaces 160 arranged to block direct radiation from exiting the upper opening 140 at angles greater than a predetermined upper opening field of view. The radiation absorbing surfaces of the upper opening may be elongate parallel planes extending in a direction parallel to the upper edges of the mirrors 130_1, 130_2, wherein each radiation absorbing surface 160 has a depth direction chosen such that substantially all radiation emerging from the upper opening 140 is parallel radiation.

In variants of the above described radiation deflectors, an upper section of at least one of the first and second wall of the radiation deflector may further comprise an interior radiation absorbing portion 162 and an exterior radiation emitting portion comprising heat fins 164, as will be described with respect to FIG. 7.

In variants of the above described radiation deflectors, the upper opening 140 of the radiation deflector 100 may comprise a plurality of upper sub-openings 140n, wherein at least one of the sub-openings is defined by a pair of adjacent radiation absorbing surfaces 160, or by an upper edge of one of the first and second mirrors and one radiation absorbing surface 160, and wherein a radiation blocking surface 166 as illustrated in FIG. 5B extends along the elongate upper edge of each of one or more of the radiation absorbing surfaces 160 and across the at least one upper sub-opening 140n to define at least one shielded upper sub-opening that blocks substantially all direct lamp radiation emerging from the at least one shielded upper sub-opening.

As described with reference to FIG. 5B, the radiation blocking surface 166 of the upper opening may extend across the at least one shielded upper sub-opening leaving a vent 168 between the outer elongate edge of the radiation blocking surface 166 and the adjacent radiation absorbing surface 160 or upper edge of the first or second mirror 130_2, so as to allow heat to escape from the deflector.

The deflector may comprise a plurality of upper sub-openings 140n, and a single radiation blocking surface 166 may extend across more than one shielded upper sub-opening of the plurality of upper sub-openings while providing a common vent for the shielded upper sub-openings.

The deflector and the lamp may be mounted near or at a first edge of the carriage 30, wherein the first edge forms a leading or trailing edge of the carriage in use, during motion of the carriage within the apparatus.

The carriage 30 may comprise one or more of a distribution module 36 or a printing module 38 wherein at least one of the modules is mounted adjacent the infrared radiation deflector and the lamp.

In general, the mirrors 130 may be located within the lamp vaporisation front. The centre line of the upper opening and the centre line of the lower opening may be parallel to the lamp axis. The lamp axis may be located nearer the lower opening than the upper opening.

A radiation deflector 100 according to the present invention may be utilised in an apparatus 1 for an elongate sintering lamp 110 or for an elongate pre-heat lamp 110. Any of the lamp assemblies 200 described above may be used in such an apparatus.

The lamps 110 may be identical, but may be operated at different duty cycles to provide different radiation power to the build bed surface 12. In the following, when providing the radiation deflector to the apparatus 1, the radiation deflector 100 comprises a lamp 110, and the lamp 110 and lamp deflector 100 in combination will be referred to as a lamp assembly 200. The lamp 110 is mounted to the end supports 170 of the deflector such that the lamp axis location is coincident with the lamp axis. The lamp assembly may be provided to the carriage 30_2 in FIG. 1 that supports the printing module 38 to be operated in sintering mode, and a second lamp assembly may be provided to the carriage 30_2 to be operated in preheat mode. Similarly, one or more radiation deflectors 100 each comprising a lamp 110 may be provided to the first carriage 30_1 supporting the powder distribution device 36. The lamp assembly may also be provided to the distribution carriage.

Figure 6:
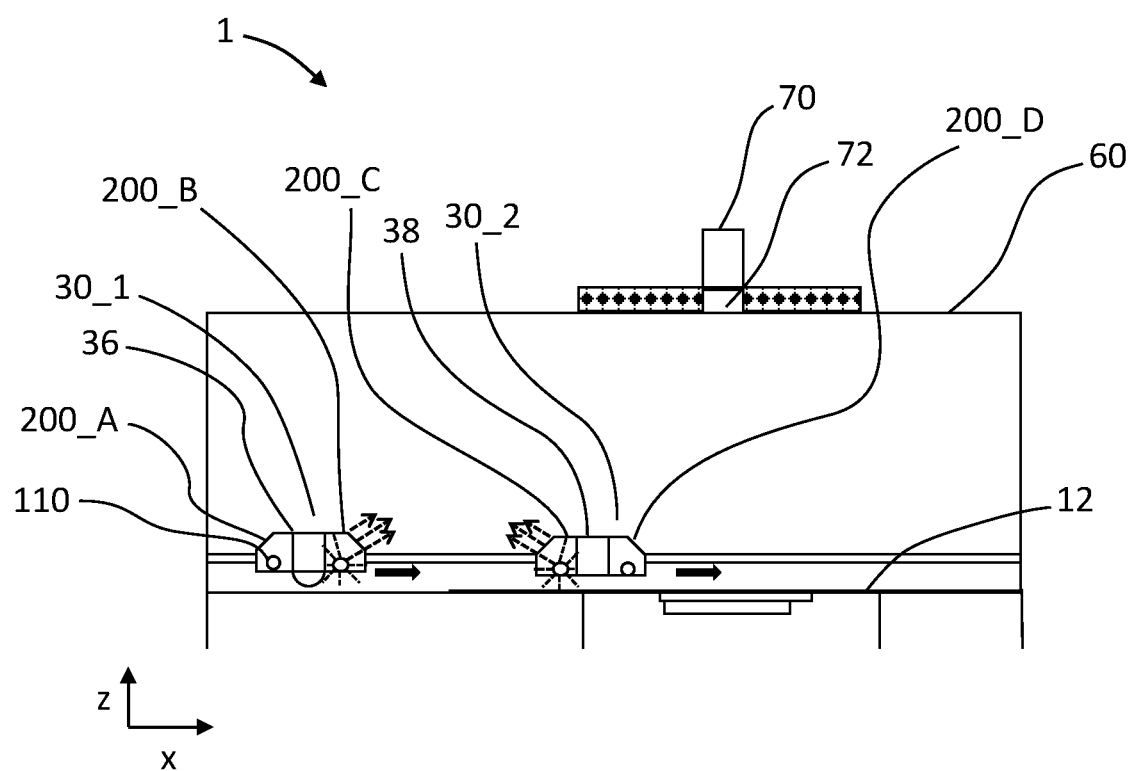
FIG. 6 is a schematic cross-sectional diagram of an apparatus for the layer-by-layer formation of three-dimensional objects comprising several lamp assemblies having infrared radiation deflectors according to present embodiments.

With reference to FIG. 6, for example, a schematic cross section through an apparatus 1 along the direction of travel of the carriages shows various lamp assemblies 200, two each mounted to each carriage.

The distribution module 36 is provided on a first carriage 30_1 between two lamp assemblies 200_A and 200_B, and the printing module 38 is provided on a second carriage 30 between lamp assemblies 200_C and 200_D.

During motion of the carriages, for example with respect to the motion of the second carriage in the direction across the build bed surface 12 indicated by the arrow, the lamp assembly 200_D is located downstream, and the lamp assembly 200_C is located upstream of the printing module 38. The lamp assembly 200_D may act as a pre-heat lamp assembly ahead of the printing module 38 and the lamp assembly 200_C may act as a sintering lamp assembly following the printing module. This means that, for example, before the printing module is operated across a fresh layer of powder to deposit RAM, the preheat lamp assembly 200_D, operating lamp 110 at a relatively lower power compared to the power required for sintering, is passed over the build bed surface 12 to pre-heat the powder to a temperature close to the sintering temperature. The lamp 110 of lamp assembly 200_C, functioning as a sintering lamp and operating at higher power than the preheat lamp, may thus not have to impart as much power to achieve consolidation of the printed powder as it would if the layer had not been preheated.

Next, the first carriage 30_1 follows the second carriage 30_2. The lamp assembly 200_A and 200_B may both be operated as preheating lamp assemblies. Lamp assembly 200_B preheats the layer just processed by the second carriage, followed by the distribution module 36 spreading a fresh layer over the thus pre-heated processed layer. This may improve the adhesion between the sintered and fresh layer. The lamp assembly 200_A may be operated as a pre-heat lamp assembly that preheats the freshly distributed layer downstream of the distribution module 36.

Alternatively, lamp assembly 200_B may be operated as a sintering lamp assembly to provide a second sintering stroke following the first sintering stroke provided by lamp assembly 200_C.

FIG. 6 further shows the deflectors emitting parallel radiation angled away from the perpendicular to the build bed surface 12 (along the z direction) and the ceiling 60. While this is not essential, this may be beneficial in not only directing the unused lamp radiation to the ceiling 60 of the working space 4 where removal of heat may be more easily managed, but also in preventing radiation from the upper opening 140 to reach any sensitive components mounted to the ceiling, such as a thermal camera 70. This will be explained in more detail with respect to FIGS. 8A and 8B.

The direction of extension of the lower opening 150 and the lamp axis location 114 are preferably arranged parallel to the build bed surface 12. The upper opening 140 at least partially faces the ceiling 60 of the apparatus that bounds the working space vertically, and thus the space above the carriages and the build bed surface 12.

As described above, during operation of the lamp 110 within the apparatus 1, the mirrors 130_1, 130_2 may preferably be located within the vaporisation front 112 of the lamp 110, so that, during operation of the lamp, the mirrors reach a pyrolysis temperature of 300° C. or more and remain reflective. For example, the pyrolysis temperature may be reached while the lamp 110 is operated as it passes over the build bed surface 12, and cools down to below pyrolysis temperature soon after the lamp 110 is switched off after passing the build bed surface 12. During a build process, the cycle of being above pyrolysis temperature may be a regular cycle, with a constant period between successive intervals during which the mirrors reach a temperature above pyrolysis, and a constant duration above the pyrolysis temperature within the period.

Accordingly, an apparatus for the formation of three-dimensional objects by consolidation of particulate material is provided, comprising a working space, the working space comprising:

a build bed surface of particulate material arranged at a lower surface bounding the working space, and a ceiling arranged at an upper surface bounding the working space; and a carriage to which an infrared radiation deflector according to the present invention is mounted and for passing the lamp assembly across the build bed surface along a direction of travel, wherein a lamp is mounted to the mounting point(s) of the radiation deflector, and the at least two openings of the infrared radiation deflector are arranged so that the lower opening allows radiation to pass towards the build bed surface and the upper opening allows radiation to pass into the working space and towards the ceiling.

Figure 7:
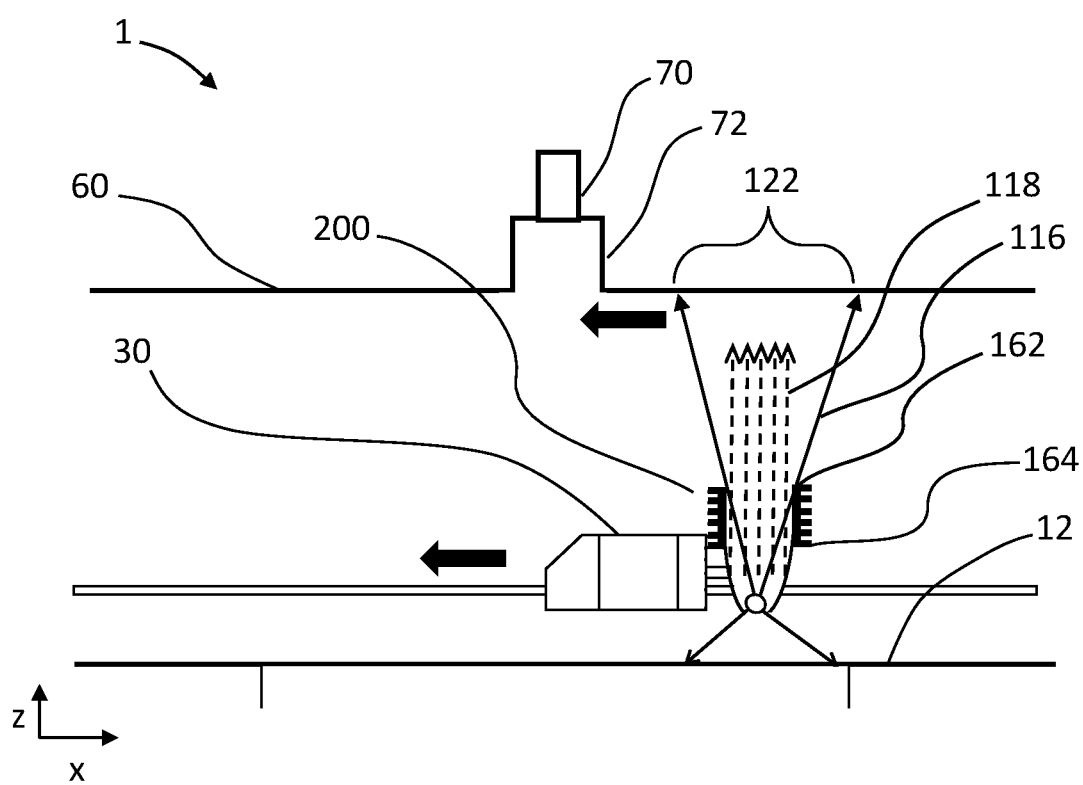
FIG. 7 is a schematic cross-sectional diagram of an apparatus for the layer-by-layer formation of three-dimensional objects comprising a lamp assembly having an infrared radiation deflector according to a variant of the embodiments of FIGS. 2A, 2B, 3A and 3B.

Vertical Parallel Radiation (FIG. 7)

With reference to FIG. 7, in a further example of the apparatus 1, again in schematic cross section, and not to scale, a linear parabolic deflector 100 is implemented as part of the lamp assembly 200. The first mirror 130_1 and the second mirror 130_2 of the radiation deflector are identical mirror sections of a linear parabolic trough arranged symmetrically about the plane of symmetry of the linear parabolic trough. The lamp assembly 200 may for example be mounted to an outboard side of the printing carriage and following the printing module in the direction of travel as indicated by the black arrow. The area of the lower opening 150 as defined by the lower edges of the internal walls of the radiation deflector is centred about the plane of symmetry. The lamp 110 is mounted to the deflector such that the lamp axis coincides with the focal line of the linear parabolic trough. The area of the upper opening 140 as defined by the upper edges of the internal walls of the radiation deflector is equally arranged centred about the axis of symmetry. In the implementation of FIG. 7, the planes of the areas of the upper opening 140 and of the lower opening 150 are parallel to one another and the lamp assembly is arranged within the apparatus 1 such that the areas of the openings are symmetrically arranged about the vertical (z) direction to the build bed surface 12. The areas are thus perpendicular to the plane of symmetry.

The internal walls of the deflector may entirely be formed by the mirrors 130_1, 130_2, such that the lower and upper edges of the deflector are the lower and upper edges of the mirrors.

With this deflector implementation, the upper opening 140 emits parallel, or substantially parallel, reflected radiation 118 and an amount of direct lamp radiation 116 that spreads out along the x-direction at the FOV angle. These two contributions of radiation define the footprint 122 of the FOV on the ceiling 60 that receives radiation from the upper opening 140. This footprint 122 moves with the movement of the carriage. The FOV in this example is defined by the size of the linear parabolic trough mirror (width and/or depth along the z direction), and the footprint 122 on the ceiling in addition by the distance between the upper opening to the ceiling 60.

This implementation of the radiation deflector further illustrates the use of radiation absorbing/emitting surfaces 162 fitted with external heat fins 164 on surfaces of the deflector that are located outside of the lamp vaporisation front 112. The surfaces 162 absorb internal direct radiation on the one hand and dissipate it to the outside on the other hand. Dissipation is improved by increasing the outer surface area with external heat fins 164. In this way the deflector walls outside of the vaporisation front 112 are not pyrolised and may be cooled by convection by allowing heat to transfer from the inside of the deflector to the outside working space.

Thus, the upper opening 140 and the lower opening 150 extend in a direction parallel to the lamp axis of the lamp 110. The upper opening and the lower opening are symmetrically arranged about the plane of symmetry of the parabolic trough with respect to their direction of elongation. The areas of the openings as defined between the respective upper and lower edges of the mirrors are also perpendicular to the plane of symmetry.

It will be appreciated that the FOV may further be delimited by providing absorbing surfaces as those shown in FIGS. 2A-C, or purely parallel radiation by providing absorbing surfaces as those shown in FIGS. 3A-B.

Delimiting the FOV of the upper opening or by allowing only parallel radiation to leave the upper opening 140 may be utilised as follows.

It can be seen how the radiation deflector 100 may be mounted to the carriage 30 such that the outer surface of the first mirror 130_1 faces the carriage. The deflector may additionally, or instead, be mounted with a gap between the outer surface of the first mirror and the carriage so that a flow of convection may be generated to reduce the thermal effect of the deflector on the carriage. In the variant of FIG. 6, the radiation emitted from the upper opening 140 emerges at an angle away from the carriage so as to manage any potential temperature effects on the carriage as a result of hot surfaces of the deflector. Therefore, the infrared radiation deflector 100 may be mounted on the outboard side of the carriage such that the upper opening at least partially faces away from the space above the carriage.

Figure 8A:
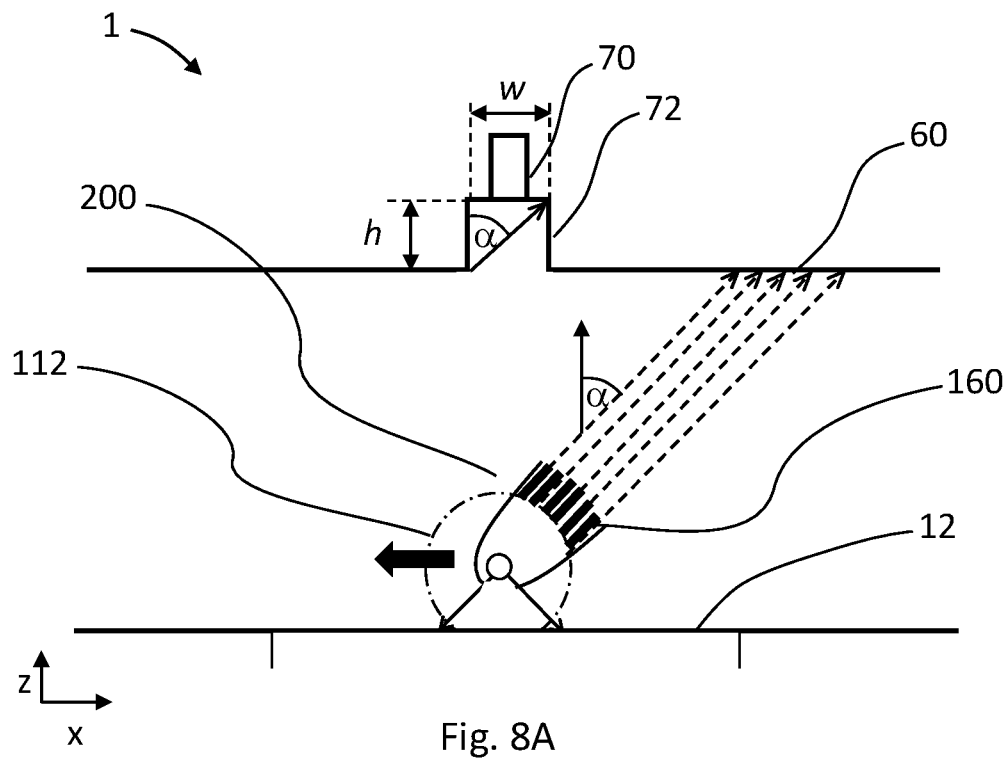
FIGS. 8A and 8B show a schematic cross-section of an apparatus for the layer-by-layer formation of three-dimensional objects comprising a lamp assembly having an infrared radiation deflector according to a variant of the embodiment of FIGS. 3A and 3B.
Figure 8B:
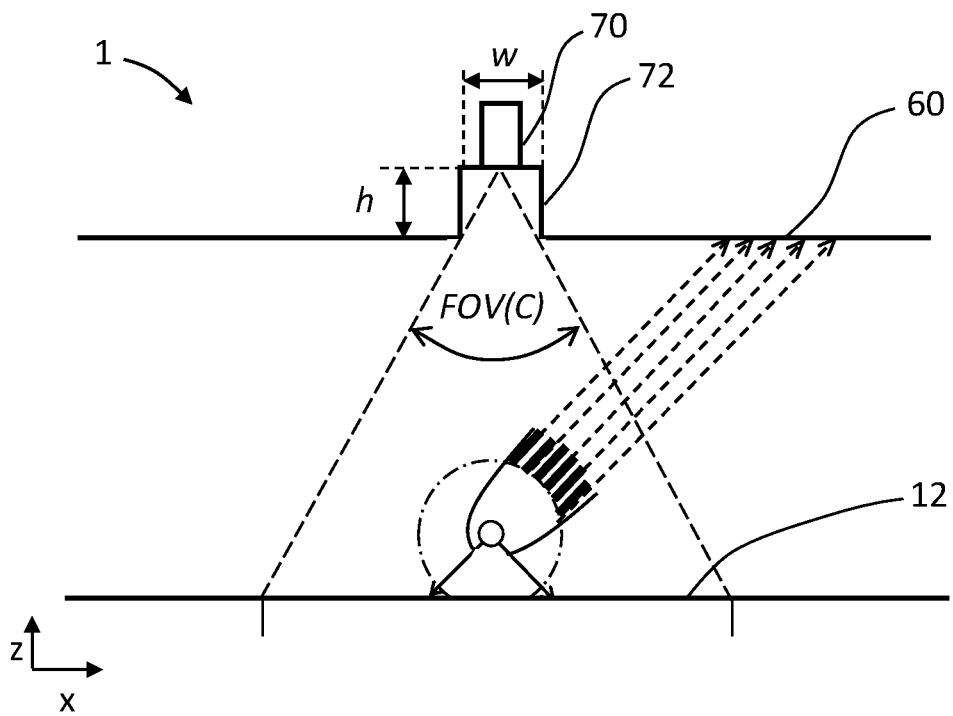

Tilted Radiation—Protecting Recessed Device (FIGS. 8A-B)

FIGS. 8A and 8B show a side view of an apparatus in which a similar linear parabolic reflector represented by the first and second mirrors as the one in FIG. 7, implemented as part of a lamp assembly 200, is provided. While the carriage is not shown this time for simplicity, the lamp assembly may be mounted behind the carriage travelling in the direction of the arrow. The lamp assembly is mounted such that the plane of symmetry of the linear parabolic trough, of which the first and second mirrors form side wall sections, is tilted by an angle $\alpha$ with respect to the perpendicular to the build bed surface 12 (along the z direction). As a result, the lower opening 150 is not symmetric about the plane of symmetry of the trough in order to maintain a symmetric FOV(L) from the lower opening.

The upper opening and the lower opening may extend in a direction parallel to the lamp axis. The upper opening in the direction of elongation may be symmetrically arranged about the plane of symmetry of the parabolic trough of the first mirror, and the lower opening may be offset in the direction of elongation about the plane of symmetry, wherein the plane of symmetry of the parabolic trough forms an acute angle with the perpendicular to the build bed surface.

Furthermore, the linear parabolic reflector 100 of the lamp assembly 200 comprises a series of absorbing surfaces 160 arranged across the upper opening. For example, the absorbing surfaces may be elongate infrared radiation absorbent planar surfaces as described above with reference to FIGS. 3A-B. They are spaced apart from one another parallel to the plane of symmetry of the linear parabolic trough. Furthermore, their spacing and depth (vertical extent) may be chosen such that any residual direct lamp radiation emerging non-parallel to the plane of symmetry is blocked. The upper opening 140 can thus be arranged to emit purely, or at least predominantly, parallel radiation at an angle $\alpha$ with respect to the perpendicular to the build bed surface 12.

This may be useful when providing radiation sensitive components at the ceiling 60 that require protection from the radiation emitted from the upper opening 140. For example, a thermal camera 70 may be mounted to the ceiling 60 to monitor the temperature of the build bed surface. To protect the camera, a recess 72 in the ceiling may be designed to have an aspect ratio r=h/w, where h is the depth of the recess along the z direction, and w is the width of the recess along the x direction, such that $\tan(\alpha)<w/h$. As the lamp assembly 200 is passed across the build bed surface, the parallel radiation emerging at an angle $\alpha$ to the vertical (z direction) from the build bed surface 12 cannot reach the top surface of the recess 72 and thus cannot irradiate the camera 70. The angle $\alpha$ is an acute angle, less than 90°, with respect to the perpendicular to the build bed surface and the ceiling, i.e. it is directed upwards towards the ceiling.

Furthermore, the recess may be designed to ensure that the field of view of the camera FOV(C) as illustrated in FIG. 7B is sufficient to capture the entire build bed surface 12 (which further depends on the height of the working space 4).

It will be appreciated that a small amount of non-parallel radiation of low intensity may be tolerated without harming any radiation sensitive devices located at or near the ceiling. Alternatively, for a small FOV, the angle of the FOV to the ceiling may be used to determine the aspect ratio of the recess.

The radiation deflector may thus be arranged within the apparatus 1 so that radiation from the upper opening 140 emerges at a field of view FOV that is not centred about the vertical direction (i.e. to the perpendicular to the ceiling 60) but instead the boundary of the FOV nearest the perpendicular to the ceiling 60 forms an acute angle $\alpha$ to the perpendicular to the ceiling. The ceiling 60 comprises a recess 72 having a recessed surface and an aspect ratio defined by the depth and width of the recess in cross section in the direction of travel of the carriage. The acute angle is chosen such that it is larger than the angle defined by the aspect ratio (i.e. larger than $\tan^{-1}(w/h)$) so that the radiation from the upper opening 140 cannot reach the recessed surface.

Optionally, the upper opening of the lamp radiation deflector may have a field of view that forms an acute angle with the perpendicular to the ceiling that, during a build process, leads and/or trails the direction of movement of the carriage.

Preferably, the recessed surface may comprise a radiation sensitive component. Furthermore, the depth of the recess may determine the field of view FOV of the upper opening 140 such that radiation emerging from the upper opening cannot reach the radiation sensitive component.

For simplicity, the term 'field of view', FOV, has been used herein to describe the extent of the infrared radiation emerging from the openings of the deflector in the various two-dimensional illustrations. It will be appreciated that the field of view emerging from the elongate openings will have a three-dimensional shape extending along the direction of elongation of the openings (along y).

Temperature Management at the Ceiling

To remove the heat generated by the radiation that the ceiling 60 receives from the upper opening 140 of the radiation deflector 100 of the lamp assembly 200, the ceiling 60 bounding the working space 4 may comprise a heat sink. The heat sink may be passive or active. For example, the ceiling may comprise a thermally conductive material so that heat received from the upper opening 140 of the deflector 100 may simply be dissipated sufficiently across and through the ceiling 60 to the outside of the apparatus 1.

Additionally, or instead, the ceiling 60 may comprise heat fins or protrusions on its internal and/or external surface (on the outside of the apparatus 1 and/or outside of the working space 4), to present an increased surface area for absorbing and/or dissipating, respectively, the radiation from the upper opening 140.

Additionally, or instead, the ceiling may furthermore be in thermal contact with an area of liquid or gas cooled ducting to actively carry away the heat absorbed by the ceiling.

Additionally, or instead, the inner ceiling surface bounding the working space 4 may be coated in an IR absorbent material that is able to absorb the radiation from the upper opening of the assembly; for example the inner ceiling surface may be black. For example, the inner ceiling surface may comprise an IR absorbent material, e.g. it may be a black body radiator.

Optionally, the inner ceiling surface may further comprise protrusions reaching into the working space so as to increase the radiation absorbent surface area capable of receiving radiation from the upper opening. The protrusions may for example be fins mounted to the inner ceiling surface.

General Considerations

Material and Thickness, Temperatures

The curvature of the mirrors need not be a smooth curve, but may instead be formed from a series of planar elongate strips attached to one another along adjacent elongate edges, at fixed or varying angle from strip to strip.

The mirrors according to the various implementations disclosed are preferably made of thin reflective sheet, preferably thin metal sheet, of a thickness between 1 mm and 0.4 mm. This ensures that in one respect, the mirrors do not present a substantial surface area facing the powder bed and emitting secondary radiation that may be absorbed by the unprinted powder. In another respect, heat is not stored by the mirrors since their thermal mass is small. This means the metal sheet cools down rapidly as soon as the lamp 110 is turned off. The mirrors may remain reflective and clean by mounting them within the vaporisation front, or by periodically operating the lamp in a sintering power mode having a vaporisation front that encompasses the mirrors so as to burn off any debris and keep the mirrors reflective.

The thin metal sheet from which the mirrors may be made may be aluminium or stainless steel, for example, as these materials are both good IR reflectors.

The function of the various radiation deflectors 100 may vary during the process of building the three-dimensional object, simply by altering the power of the lamp 110. The preheat function may result in a smaller vaporisation front than the sintering function. As a result, the mirrors may need to be located closer to a lamp used solely as a pre heat lamp compared to the shield(s) location with respect to a sintering lamp, so as to ensure that the shield(s) of the pre heat lamp remain reflective. Alternatively, the lamp power of the preheat lamp may temporarily be increased during maintenance so as to pyrolise and clean the mirrors.

In some implementations of the radiation deflector, the mirrors may be mounted to the end supports or to the carriage with minimal contact area so as to limit thermal conduction between the mirrors and the end supports (and thus between the end faces and any mounting points to the carriage).

The mirrors may be made at least partially of thermally non-conductive ceramic coated in reflective metal (e.g. aluminium or stainless steel) where facing the lamp. Alternatively, the surface of the shield not facing the lamp may be coated with a thermally insulating layer; or the outer surface not facing the lamp may be a non-conductive ceramic having an inner surface coated in a thin metal layer. This may further protect the carriage 30 from the extreme temperatures the deflector may reach.

In some implementations of the apparatus 1 when having a plurality of infrared lamps supported on one or more carriages, it may be desirable to provide different variants of the deflectors herein to respective lamps 110.

Furthermore, in addition to the lamp assembly 200, an alternative assembly may be provided to one or of the lamps. Such an alternative may allow for substantially unimpeded transmission of radiation energy reflected upwards from the powder layer, such that the radiation energy passes through the assembly. In addition, any surfaces of the assembly facing the build bed surfaces may be kept to a minimal area, so that the assembly can only absorb heat over a small area. One of the carriages may for example support an assembly that has radiation deflecting mirrors as described above, as well as an 'open' assembly as will now be described. Additionally, or instead, a second carriage may comprise such an alternative, 'open' assembly.

Figure 9A:
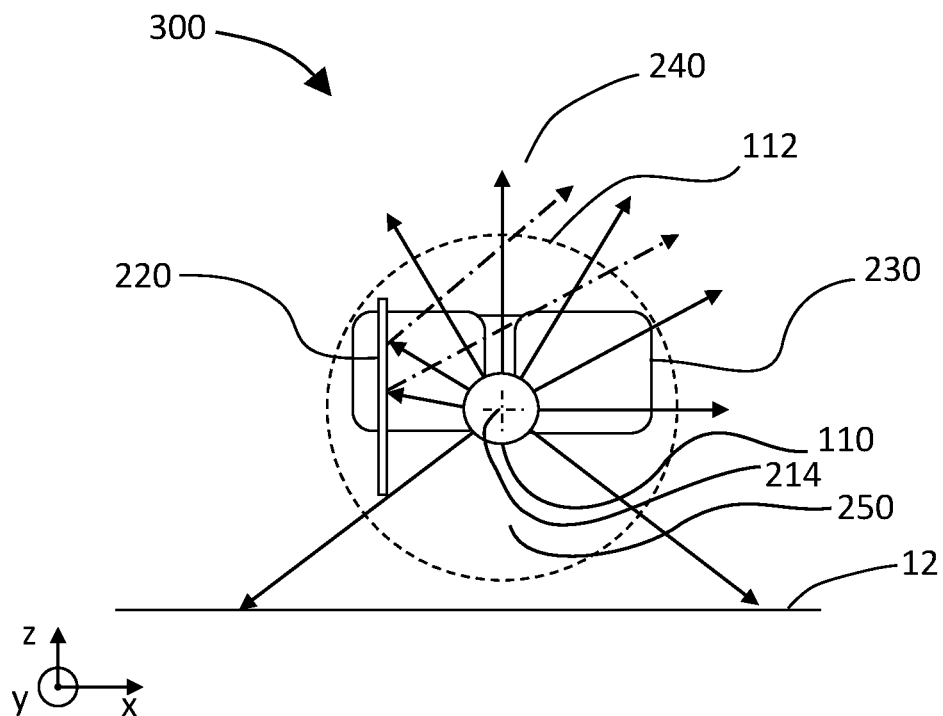
FIG. 9A is a schematic cross section view of an 'open' lamp assembly according to a variant of the apparatus.
Figure 9B:
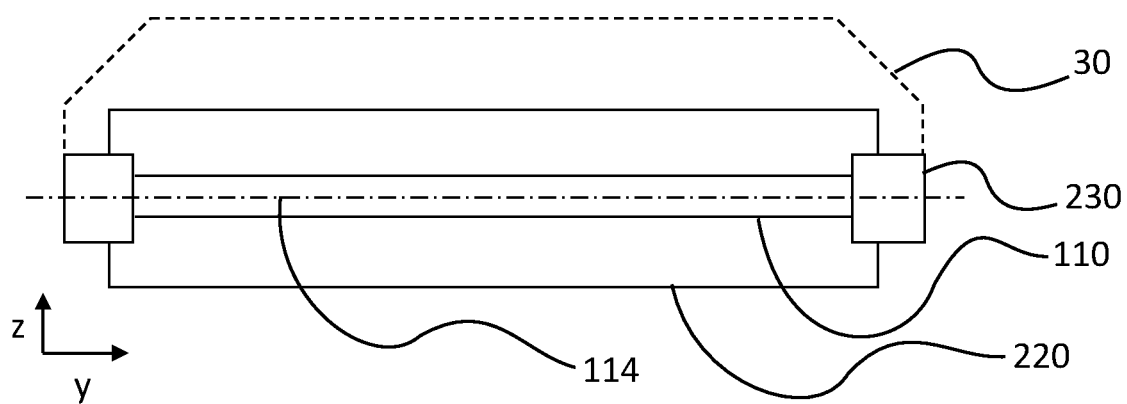
FIG. 9B is a schematic side view of the open infrared lamp assembly of FIG. 9A.

An example of an 'open' lamp assembly is shown, in a schematic cross-sectional view along the direction of elongation of the lamp, in FIG. 9A. FIG. 9B is a side view of FIG. 9A. The open assembly 300 comprises an elongate infrared lamp extending along a lamp axis, and an elongate shield 220 extending parallel to and along one side of the axis 214 of the lamp. It may further comprise a support structure holding at least one of the ends of the lamp 110 and of the shield 220, however the support structure may instead be provided on the carriage to which the lamp and shield are to be mounted. The elongate shield at least partially bounds the space to one side of the lamp 110, and the assembly provides a lower opening 250 below the lamp and an upper opening 240 above the lamp, such that radiation generated by the lamp 110 is able to radiate through the openings 240, 250 and away from the lamp in directions not bounded by the shield.

Within the apparatus 1, the open assembly of the lamp 110 and shield 220 may be directly mounted to supports provided on the carriage 30 (shown in dashed outline in FIG. 9B) such that the shield is located between the lamp and surfaces of the carriage facing the lamp, and the at least two openings of the open infrared lamp assembly 300 are arranged so that the lower opening 250 allows radiation to pass towards the build bed surface and the upper opening 240 allows radiation to pass away from the build bed surface 12 into the working space and towards the ceiling 60 of the apparatus.

The infrared lamp 110 is supported at one or at both of its ends by a lamp support 230, where the lamp support 230 may be part of a frame attached to or part of the carriage. Alongside the lamp, the elongate shield 220 is mounted to a shield support, here shown as the same support, lamp support 230, so that its direction of elongation extends parallel to the lamp axis 214.

It is not essential to the function of the 'open assembly' that the lamp and shield are mounted to the same support, different supports, or to one or two supports integral to the carriage, etc.

When mounted to a carriage 30 above a build bed surface 12 within the apparatus 1, the shield surface may be further oriented so that it extends substantially vertically upwards, along a direction perpendicular to the lamp axis (the z-direction in FIG. 9A), as also indicated in the cross-sectional schematic in FIG. 9A, where it is shown how the open infrared lamp assembly 300 may be positioned above a build bed surface 12. The lamp axis 214 and elongate direction of the shield 220 meanwhile extend parallel to the build bed surface 12, as is illustrated in a schematic side view of the assembly in FIG. 9B. In this way, the open infrared lamp assembly 300 provides a shield 220 mounted to one side of and parallel to the lamp axis 214, and an upper opening 240 above and a lower opening 250 below the lamp, such that the lamp can radiate through the lower opening 250 and through the upper opening 240 of the assembly.

When the assembly 300 is mounted in the apparatus 1, radiation is able to radiate towards the build bed surface 12 through the lower opening 250, and unimpeded upwards into the working space 4 through the upper opening 240, where the working space 4 is bounded above by the ceiling 60. At the same time, there is minimal shield surface directly facing the powder bed surface 12, so that any secondary radiation emitted from the shield 120 cannot significantly affect the temperature of the unprinted (white) powder and thus compromise the selectivity of consolidating the printed and unprinted powder. In addition, any radiation reflected back from the build bed surface 12 can pass through the open assembly 300, while the minimal shield surface directly facing the powder bed surface 12 only absorbs a small amount of reflected radiation.

Overall, similar to the radiation deflector, it may be beneficial that the shield is made of a thin sheet, preferably a thin metal sheet, of a thickness between 1 mm and 0.4 mm, such that it has a low thermal mass and thus is able to cool down quickly when the lamp is switched off.

An open assembly may dissipate unused infrared lamp radiation more readily than the assembly 200 comprising a deflector as described herein, where depending on the use of the lamp 100 of the open assembly 300 it may not be necessary to control the field of view of radiation emerging from the upper opening, as is possible with the assembly 200 comprising an infrared radiation deflector 100. Thus, a combination of different benefits may be provided in the apparatus 1 when using the two types of lamp assemblies 200, 300 for respective infrared lamps.

It is not essential, when mounted to the carriage 30, that the surface of the shield 220 extends substantially vertically upwards from the build bed surface 12. Alternative configurations and arrangements of the shield 220 may be envisaged. For example, a slight curve or angled flange may be provided to the shield to aid upward reflection of lamp radiation, and/or to provide structural stiffness without presenting a significant area facing the powder bed surface.

Figure 10A:
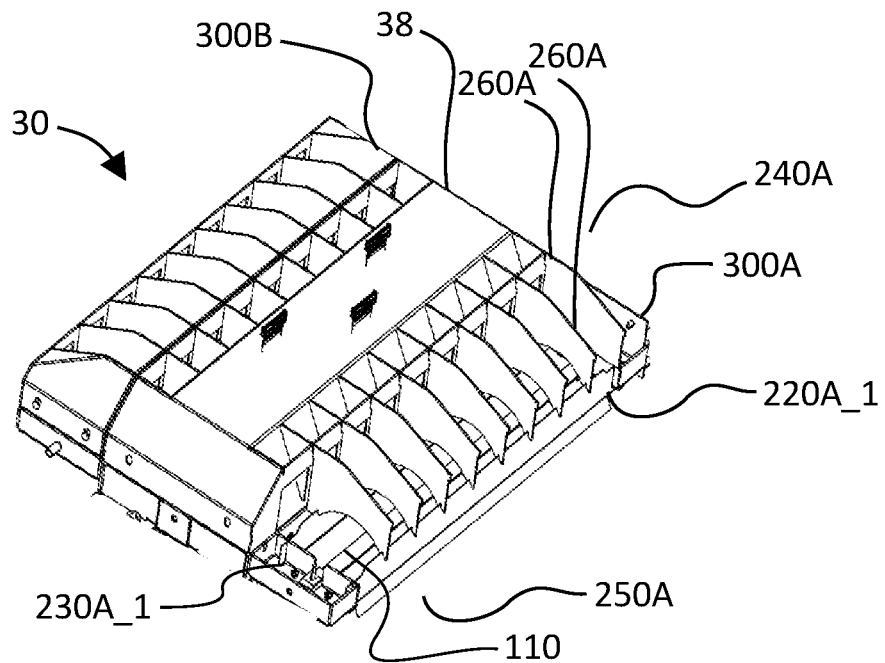
FIG. 10A is a schematic three-dimensional illustration of a carriage of the apparatus comprising two open infrared lamp assemblies in which upper sub-openings are defined by guards.
Figure 10B:
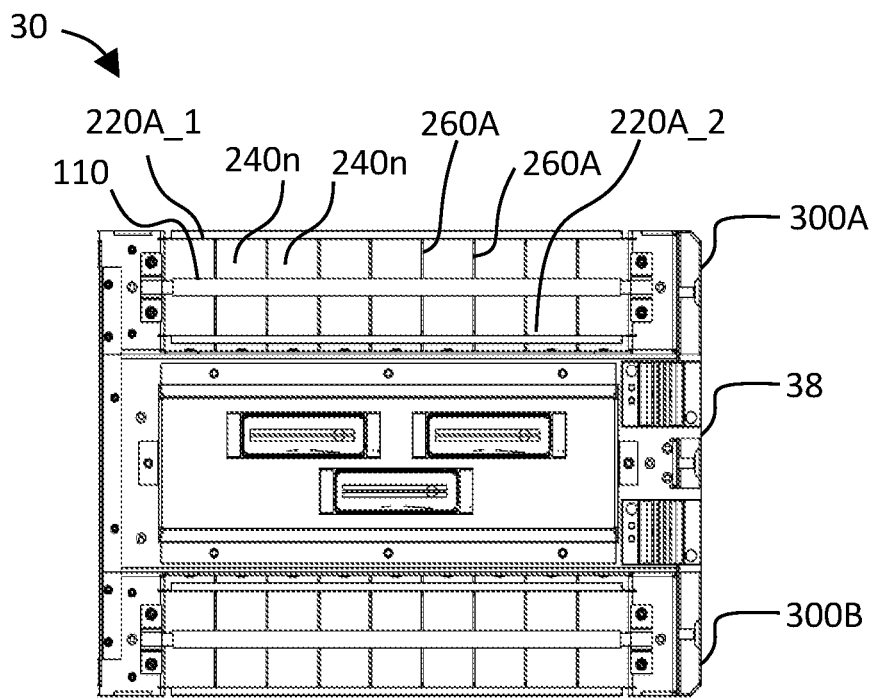
FIG. 10B is a plan view from below of the carriage of FIG. 10A.

As shown in FIGS. 10A and 10B, the open infrared lamp assembly 300 may further have crosswise struts between the upper edges of the shields 220A_1 and 220A_2, defining upper sub-openings 240n between adjacent pairs of struts of the upper opening 240A. These struts, preferably of the same material as the shield 220, such as thin metal sheet, are for protective purposes and designed so as to not significantly restrict radiation from passing through the upper opening. The surface area presented by the struts only insignificantly restricts the passage of radiation through the upper opening 240A. Preferably, the struts are located outside of the vaporisation front and their downward facing surface is coated in radiation absorbent material so as to prevent lamp radiation being reflected down towards the build bed surface 12. For the variant of FIGS. 10A and 10B, although not essential, each of the struts of the series of crosswise struts furthermore extends upward away from the upper opening to form a series of planar guards 260A extending away from the lamp 110 so as to allow radiation to pass through the upper sub-openings. The guards 260A are mounted parallel to one another down the direction of elongation of the upper edges of the shields 220A_1, 220A_2 as indicated for open assembly 300A (similarly for open assembly 300B). A lower opening 250A exists below the lamp 110.

The sub-openings 240n of open assembly 300A shown in FIG. 10B are thus defined by the spacing between the guards 260A. The guards 260A are in the form of planar protrusions extending away from the upper opening 240A, which is the combination of the sub-openings 240n, along a radial direction, so as to protect a viewer from direct lamp radiation and to prevent a user from being able to access the lamp 110, or to accidentally touch hot surfaces close to the lamp 110. The guards 260A are preferably made of thin metal so as to present a negligible obstruction to the upper opening. In this way, the guards 260A do not significantly restrict radiation from passing through the sub-openings 240n of the upper opening 240A, and do not present an obstruction to radiation leaving the upper opening 240A in a direction vertically upwards. The downward facing surface area of the guards 260A (the lower edge defined by the thickness of the sheet of which the guards are made) are preferably arranged to be located outside of the lamp vaporisation front 112. In addition, the downward facing surface may be coated in radiation absorbent material so as to prevent lamp radiation being reflected down towards the build bed surface 12.

Therefore, the carriage 30, in addition to having mounted to it the infrared radiation deflector 100 and infrared lamp 110, may further have mounted to it an open infrared lamp assembly 300, wherein the open infrared lamp assembly comprises an elongate infrared lamp 110 extending along a (second) lamp axis 214, and an elongate shield 220 extending parallel to and along one side of the second lamp axis 214, wherein the elongate shield 220 at least partially bounds the space to one side of the second lamp 110, and wherein the open infrared lamp assembly 300 provides a second lower opening 250 below the second lamp and a second upper opening 240 above the second lamp, such that radiation generated by the second lamp is able to radiate through the second openings 250, 240 and away from the second lamp in directions not bounded by the shield 220.

On the carriage 30, the deflector 100 and respective lamp 110 and the open infrared lamp assembly 300 may be mounted side by side so that the lamp axis 114 and the second lamp axis 214 extend parallel next to one another, i.e. the lamps may be positioned parallel alongside one another.

The open infrared lamp assembly 300 may further, or instead, be mounted near or at a second edge of the carriage 30, the second edge being opposite the first edge, wherein the second edge forms a trailing or leading edge relative to the first edge. During movement of the carriage the edges represent leading or trailing edges of the carriage.

In any of the variants described herein of the carriage 30, one or more of a distribution module 36 or a printing module 38 may be provided on the carriage 30, wherein at least one of the modules 36, 38 is mounted adjacent the infrared radiation deflector and its respective lamp 110.

Various combinations of carriage arrangements comprising variants of the lamp assemblies 100 having a radiation deflector and of the 'open' assembly 200 may be envisaged. The open lamp assembly 300 may be mounted to one side of e.g. the distributor module 36 (for example upstream, to the leading edge, of the distributor), while the radiation deflector 100 and lamp 110 are mounted to the other side of the distribution module 36 (for example downstream, to the trailing edge, of the distributor). More than one of each of the deflector 100 and associated lamp 110 and of the open lamp assembly 300 may be provided to the carriage 30.

In the apparatus, comprising the carriage 30 as described herein comprising the infrared radiation deflector 100 and infrared lamp 110, and comprising a working space 4, the working space 4 comprising a build bed surface 12 of particulate material arranged at a lower surface bounding the working space, and a ceiling 60 arranged at an upper surface bounding the working space 4; the carriage 30 is arranged to move across the build bed surface 12; and the radiation deflector 100 and the lamp 110 on the carriage are positioned so that, in use, the lower opening 150 passes radiation from the lamp towards the build bed surface 12 and the upper opening 140 passes radiation from the upper opening 140 of the deflector into the working space 4 and, optionally, towards the ceiling 60.

The infrared radiation deflector 100 may be mounted to the carriage 30 so that radiation from the upper opening 140 emerges with a field of view that forms an acute angle to the perpendicular to the ceiling 60. Typically the perpendicular to the ceiling 60 is parallel to the perpendicular to the build bed surface 12.

When the carriage 30 is comprised within the apparatus 1, the deflector may be mounted such that the radiation blocking surface 166, or surfaces, extend substantially parallel to the build bed surface 12, as illustrated in FIG. 5B.

In variants of the apparatus 1 in which the ceiling 60 comprises a recess 72 having a recessed surface at a depth h and of a width w in cross section in the direction of movement of the carriage 30, the acute angle may be larger than $\tan^{-1}(w/h)$.

Additionally, the recessed surface may comprise a radiation sensitive component, and the depth h and the width w of the recess may determine the acute angle of the field of view FOV of the upper opening 140 to the perpendicular to the ceiling 60 such that radiation emerging from the upper opening 140 does not reach the radiation sensitive component during movement of the carriage.

The apparatus may comprise a second carriage 30_2 moveable across the build bed surface 12 independently of the first carriage 30_1. The second carriage may comprise a second infrared radiation deflector 100 and respective lamp mounted to the second carriage.

The open lamp assembly 300 as herein described may be mounted to one or both of the first or second carriage. For example, the first carriage 30_1 may comprise the deflector 100 and the infrared lamp 110, and the second carriage 30_2 may comprise the open assembly 300. The first carriage 130_1 may further comprise a printing module 38 and the second carriage 30_2 may further comprise a distribution module 36, or vice versa. Either carriage or both carriages may comprise one or more of each of the deflector 100 and lamp 110 and the open assembly 300.

The inner ceiling surface of the ceiling 60 of the apparatus 1 may comprise an IR absorbent material. Additionally, or instead, the inner ceiling surface may comprise protrusions reaching into the working space 4 so as to increase the radiation absorbent surface area capable of receiving radiation from the upper opening 140.

The components of the open assembly 300, specifically the protrusions 260, and any supports, may further comprise a radiation absorbing, e.g. black, finish on all surfaces to aid absorption and radiation (transfer) of heat. Similarly, the outer surface of the radiation deflector of the assembly 100 may have a radiation absorbing, e.g. black, finish.

The infrared lamp 110 may be an elongate lamp such as a tube emitter, such as a 3000 W, 400V reflector-type Victory lamp, but not limited to such. The infrared lamp 110 may comprise a tube having a reflective coating along part of the inner tube surface, for example covering half of the inner tube surface. When mounted in the apparatus 1, the reflective coating is on the top portion of the tube to reflect and focus lamp radiation emitted from the upper half of the lamp 110 to the build bed surface 12. The lamp 110 is mounted in conventional apparatus such that the concave reflector faces the build bed surface 12 and focusses the lamp radiation along a perpendicular to the build bed surface 12, vertically below the lamp 110.

The elongate infrared lamp need not be a tube lamp spanning the direction of elongation of the assembly. Instead, a series of IR lamps may be arranged to form a row representing the elongate infrared lamp. Within the apparatus 1, the purpose of the elongate configuration is to span the width of the build bed surface 12 so as to provide homogeneous irradiation to all parts along the width of the build bed surface 12, and this may be achieved by a single lamp or by multiple lamps spanning the width of the build bed surface 12.

Where a plurality of lamps is provided to the apparatus, the lamps may be identical lamps or they may be different lamps, for example they may emit different spectra of infrared radiation. The deflectors may be different for the different lamps or they may be the same.

While the examples illustrate the use of the radiation deflector in a high speed sintering process, the radiation deflector may equally find use in a laser sintering apparatus where it may house a preheat lamp mounted on the distribution carriage, for example.

While the examples illustrate an apparatus comprising carriages that travel back and forth along the same direction, across the length of the build bed (along the x direction), this is not essential. Equally, the lamp assembly may be provided to a carriage travelling cross wise along the width of the build bed, or in any other manner suitable to irradiate the build bed surface.

The invention claimed is:

1. An infrared lamp carriage for an apparatus for the formation of three-dimensional objects by consolidation of particulate material, the infrared lamp carriage comprising an infrared radiation deflector and an elongate infrared lamp mounted to the infrared lamp carriage, wherein the lamp extends, in a length direction, along a lamp axis, and wherein the radiation deflector comprises:

opposing first and second elongate side walls, wherein the first and second elongate side walls comprise a first elongate mirror and a second elongate mirror extending parallel to the lamp axis and along at least a lower internal portion of the respective first and second side walls; and an upper opening and a lower opening between the first and second side walls and arranged to pass lamp radiation to an exterior of the radiation deflector; wherein the lamp axis extends along and between the first mirror and the second mirror, the first mirror and second mirror each having a concave surface with respect to the lamp axis;

wherein the first mirror is an upward deflecting mirror concave with respect to the upper opening and positioned so as to redirect at least a portion of direct lamp radiation through the upper opening.

2. The infrared lamp carriage of claim 1, wherein the second mirror of the infrared radiation deflector is a reflecting mirror positioned so as to reflect direct lamp radiation onto the first mirror.

3. The infrared lamp carriage of claim 1, wherein the second mirror of the infrared radiation deflector represents an elongate section of a cylindrical mirror with a cross section as viewed down the lamp axis that is part of a circle.

4. The infrared lamp carriage of claim 1, wherein the first mirror of the infrared radiation deflector represents a section along and to one side of the vertex line of a linear parabolic trough so that the cross section of the first mirror as viewed down the lamp axis is part of a parabola positioned so as to redirect at least a portion of lamp radiation in the form of parallel radiation through the upper opening.

5. The infrared lamp carriage of claim 2, wherein the first mirror of the infrared radiation deflector represents a section along and to one side of the vertex line of a linear parabolic trough so that the cross section of the first mirror when viewed down the lamp axis is part of a parabola positioned so as to redirect at least a portion of the radiation reflected onto it by the second mirror in the form of parallel radiation through the upper opening.

6. The infrared lamp carriage of claim 1, wherein the first mirror and the second mirror of the infrared radiation deflector represent respective sections along and to opposite sides of the vertex line of a linear parabolic trough, and wherein each mirror is concave with respect to the upper opening and arranged to deflect at least a portion of direct lamp radiation in the form of parallel radiation through the upper opening.

7. The infrared lamp carriage of claim 6, wherein, when viewed in cross section down the lamp axis, the upper opening of the infrared radiation deflector is arranged symmetrically with respect to the plane of symmetry of the linear parabolic trough.

8. The infrared lamp carriage of claim 6, wherein the first mirror and the second mirror of the infrared radiation deflector, when viewed in cross section down the lamp axis, are non-identical sections along and to opposite sides of the vertex line of a linear parabolic trough arranged with its focal line at the lamp axis, and wherein the lower opening extends off-centre with respect to the vertex line.

9. The infrared lamp carriage of claim 1, wherein the lower opening and the upper opening of the infrared radiation deflector are elongate and arranged parallel to the lamp axis.

10. The infrared lamp carriage of claim 1, wherein the lamp axis of the infrared radiation deflector coincides with one or both of the focal line of the first mirror and the focal line of the second mirror.

11. The infrared lamp carriage of claim 1, wherein the upper opening of the infrared radiation deflector comprises one or more radiation absorbing surfaces arranged to block direct radiation from exiting the upper opening at angles greater than a predetermined upper opening field of view.

12. The infrared lamp carriage of claim 11, wherein the radiation absorbing surfaces of the upper opening are elongate parallel planes extending in a direction parallel to the upper edges of the mirrors, wherein each radiation absorbing surface has a depth direction chosen such that substantially all radiation emerging from the upper opening is parallel radiation.

13. The infrared lamp carriage of claim 12, wherein the upper opening of the radiation deflector comprises a plurality of upper sub-openings, wherein at least one of the sub-openings is defined by a pair of adjacent radiation absorbing surfaces, or by an upper edge of one of the first and second mirrors and one radiation absorbing surface, and wherein a radiation blocking surface extends along the elongate upper edge of each of one or more of the radiation absorbing surfaces and across the at least one upper sub-opening to define at least one shielded upper sub-opening that blocks substantially all direct lamp radiation emerging from the at least one shielded upper sub-opening.

14. The infrared lamp carriage of claim 13, wherein the radiation blocking surface of the upper opening extends across the at least one shielded upper sub-opening leaving a vent between the outer elongate edge of the radiation blocking surface and the adjacent radiation absorbing surface or upper edge of the first or second mirror, so as to allow heat to escape from the deflector.

15. The infrared lamp carriage of claim 13, wherein the deflector comprises a plurality of upper sub-openings, and wherein a single radiation blocking surface extends across more than one shielded upper sub-opening of the plurality of upper sub-openings while providing a common vent for the shielded upper sub-openings.

16. The infrared lamp carriage of claim 1, wherein the deflector and the lamp are mounted near or at a first edge of the carriage, wherein the first edge forms a leading or trailing edge of the carriage in use, during motion of the carriage within the apparatus.

17. An infrared lamp carriage for an apparatus for the formation of three-dimensional objects by consolidation of particulate material, the infrared lamp carriage comprising a deflecting infrared lamp assembly and an open lamp assembly, wherein the deflecting lamp assembly comprises an infrared radiation deflector and an elongate infrared lamp mounted to the infrared lamp carriage, wherein the lamp extends, in a length direction, along a lamp axis; wherein the radiation deflector comprises:

opposing first and second elongate side walls, wherein the first and second elongate side walls comprise a first elongate mirror and a second elongate mirror extending parallel to the lamp axis and along at least a lower internal portion of the respective first and second side walls; and an upper opening and a lower opening between the first and second side walls and arranged to pass lamp radiation to an exterior of the radiation deflector; wherein the lamp axis extends along and between the first mirror and the second mirror, the first mirror and second mirror each having a concave surface with respect to the lamp axis;

wherein the first mirror is an upward deflecting mirror concave with respect to the upper opening and positioned so as to redirect at least a portion of direct lamp radiation through the upper opening; and wherein the open infrared lamp assembly comprises:

a second elongate infrared lamp extending along a second lamp axis, and an elongate shield extending parallel to and along one side of the second lamp axis, wherein the elongate shield at least partially bounds the space to one side of the second lamp, and wherein the open infrared lamp assembly provides a second lower opening below the second lamp and a second upper opening above the second lamp, such that radiation generated by the second lamp is able to radiate through the second openings and away from the second lamp in directions not bounded by the shield; and wherein the deflecting infrared lamp assembly and the open infrared lamp assembly are mounted side by side so that the lamp axis and the second lamp axis extend in parallel next to one another.

18. The infrared lamp carriage of claim 17, wherein the deflecting infrared lamp assembly is mounted near or at a first edge of the carriage, wherein the first edge forms a leading or trailing edge of the carriage in use, during motion of the carriage within the apparatus, wherein the open infrared lamp assembly is mounted near or at a second edge of the carriage, the second edge being opposite the first edge, and wherein the second edge forms a trailing or leading edge relative to the first edge.

19. The infrared lamp carriage of claim 17, further comprising one or more of a distribution module or a printing module, wherein at least one of the modules is mounted adjacent the deflecting infrared lamp assembly.

20. An infrared lamp carriage for an apparatus for the formation of three-dimensional objects by consolidation of particulate material, the infrared lamp carriage comprising two deflecting infrared lamp assemblies and a distribution module for distributing particulate material across the build bed surface or a printing module for depositing fluid, wherein each deflecting lamp assembly comprises an infrared radiation deflector and an elongate infrared lamp mounted to the infrared lamp carriage, wherein the lamp extends, in a length direction, along a lamp axis; wherein the radiation deflector comprises:

opposing first and second elongate side walls, wherein the first and second elongate side walls comprise a first elongate mirror and a second elongate mirror extending parallel to the lamp axis and along at least a lower internal portion of the respective first and second side walls; and an upper opening and a lower opening between the first and second side walls and arranged to pass lamp radiation to an exterior of the radiation deflector; wherein the lamp axis extends along and between the first mirror and the second mirror, the first mirror and second mirror each having a concave surface with respect to the lamp axis;

wherein the first mirror is an upward deflecting mirror concave with respect to the upper opening and positioned so as to redirect at least a portion of direct lamp radiation through the upper opening; and wherein the one or more of a distribution module or a printing module is positioned between the two deflecting infrared lamp assemblies.

* * * * *